United States Patent
Murasumi et al.

(10) Patent No.: US 11,407,447 B2
(45) Date of Patent: Aug. 9, 2022

(54) DRIVE ASSIST DEVICE

(71) Applicant: DENSO TEN Limited, Kobe (JP)

(72) Inventors: Miki Murasumi, Kobe (JP); Shinichi Moriyama, Kobe (JP)

(73) Assignee: DENSO TEN Limited, Kobe (JP)

( * ) Notice: Subject to any disclaimer, the term of this patent is extended or adjusted under 35 U.S.C. 154(b) by 326 days.

(21) Appl. No.: 16/740,552

(22) Filed: Jan. 13, 2020

(65) Prior Publication Data
US 2020/0277009 A1    Sep. 3, 2020

(30) Foreign Application Priority Data

Feb. 28, 2019   (JP) .............................. JP2019-035399

(51) Int. Cl.
| | |
|---|---|
| *B60R 1/00* | (2022.01) |
| *G06T 11/60* | (2006.01) |
| *B62D 15/02* | (2006.01) |
| *G06T 7/73* | (2017.01) |
| *G06K 9/00* | (2022.01) |
| *B62D 1/00* | (2006.01) |
| *B62D 1/06* | (2006.01) |
| *B62D 53/06* | (2006.01) |
| *G06V 20/56* | (2022.01) |

(52) U.S. Cl.
CPC ......... *B62D 15/0295* (2013.01); *B62D 53/06* (2013.01); *G06V 20/56* (2022.01)

(58) Field of Classification Search
None
See application file for complete search history.

(56) References Cited

U.S. PATENT DOCUMENTS

| | | | | |
|---|---|---|---|---|
| 10,427,716 | B2* | 10/2019 | Xu ...................... | B62D 15/021 |
| 10,748,298 | B2* | 8/2020 | Maruoka ................ | B60K 35/00 |
| 2015/0115571 | A1* | 4/2015 | Zhang ...................... | B60D 1/62 |
| | | | | 280/477 |
| 2016/0375831 | A1* | 12/2016 | Wang ..................... | G06F 3/048 |
| | | | | 348/148 |
| 2018/0272941 | A1* | 9/2018 | Bliss ........................ | G06N 3/08 |

FOREIGN PATENT DOCUMENTS

JP     2018-133712 A     8/2018

* cited by examiner

*Primary Examiner* — Adam D Tissot
(74) *Attorney, Agent, or Firm* — Oliff PLC

(57) ABSTRACT

A drive assist device installed in a tractor vehicle having a connection portion to be connected to a vehicle to be towed, includes: an image acquisition unit which acquires an image taken from a camera that shoots a scene in a shooting range including the connection portion; a position detection unit which detects a position of a counterpart connection portion, to be connected to the connection portion, of the vehicle to be towed; a predicted line generation unit which generates a predicted course line that the connection portion is expected to follow based on a steering angle of the tractor vehicle; a deviation calculation unit which calculates a deviation between the counterpart connection portion and the predicted course line as defined herein; a support image generation unit which generates a support image as defined herein; and an image synthesis unit which generates a synthesized image as defined herein.

12 Claims, 20 Drawing Sheets ated when the drive assist device according to the first
DRIVE ASSIST DEVICE

CROSS-REFERENCE TO RELATED APPLICATIONS

This application is based on and claims priority under 35 USC 119 from Japanese Patent Application No. 2019-035399 filed on Feb. 28, 2019.

TECHNICAL FIELD

The present invention relates to a drive assist device that is installed in a tractor vehicle for towing a vehicle to be towed.

BACKGROUND ART

A drive assist device is known that displays a predicted course of a connection portion called a towing or a hitch attached to a tractor vehicle in connecting a vehicle to be towed to the tractor vehicle.

JP-A-2018-133712 discloses a drive assist device in which a predicted course line that a connection portion is expected to follow is shown according to a steering angle in an image taken by a rear camera that is installed in a tractor vehicle.

However, in the drive assist device disclosed in JP-A-2018-133712, it is difficult to recognize, in a quantitative manner, to what extent the connection portion of the tractor vehicle and a counterpart connection portion, to be connected to the connection portion, of a vehicle to be towed are deviated from each other. Furthermore, the drive assist device disclosed in JP-A-2018-133712 cannot provide information relating to a deviation between the connection portion and the counterpart connection portion such as how to manipulate a steering wheel to remove the deviation. As such, the drive assist device disclosed in JP-A-2018-133712 has room for improvement in facilitating work of connecting a counterpart connection portion to a connection portion.

SUMMARY OF INVENTION

In view of such situation, an object of the present invention is to provide a drive assist device that allows a driver of a tractor vehicle to connect the tractor vehicle to a vehicle to be towed easily.

The invention provides a drive assist device which is installed in a tractor vehicle having a connection portion to be connected to a vehicle to be towed, comprising an image acquisition unit, a position detection unit, a predicted line generation unit, a deviation calculation unit, a support image generation unit, and an image synthesis unit. The image acquisition unit acquires an image taken from a camera that shoots a scene in a shooting range including the connection portion. The position detection unit detects a position of a counterpart connection portion, to be connected to the connection portion, of the vehicle to be towed. The predicted line generation unit generates a predicted course line that the connection portion is expected to follow on the basis of a steering angle of the tractor vehicle. The deviation calculation unit calculates a deviation between the counterpart connection portion and the predicted course line in a width direction of the vehicle to be towed on the basis of the position of the counterpart connection portion and the predicted course line. The support image generation unit generates a support image to be used for reducing the deviation calculated by the deviation calculation unit. The image synthesis unit generates a synthesized image by combining the predicted course line and the support image with the image taken and displays the generated synthesized image on a display device.

The invention can provide a drive assist device that allows a driver of a tractor vehicle to connect the tractor vehicle to a vehicle to be towed easily.

DETAILED DESCRIPTION OF THE INVENTION

Figure 1:
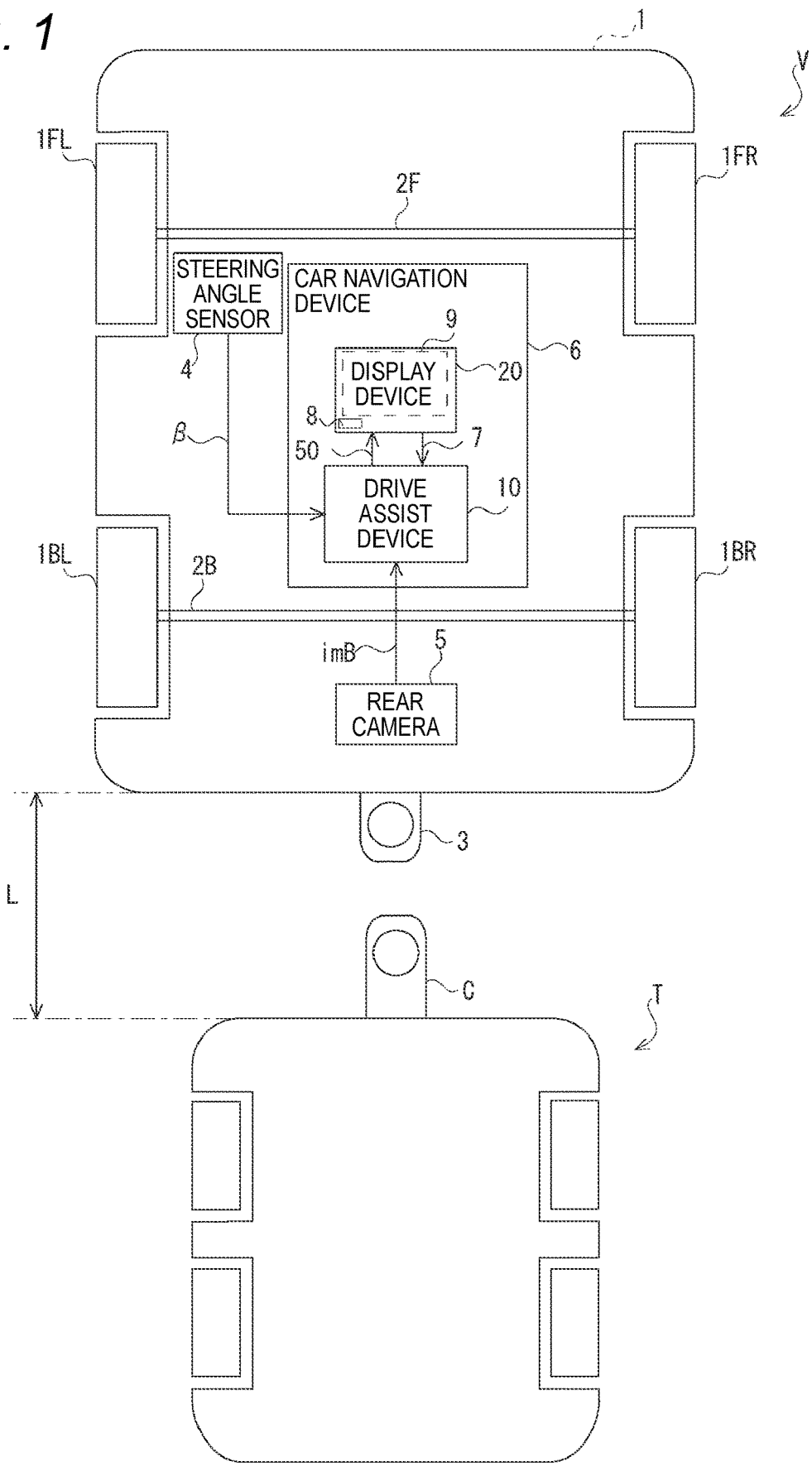
FIG. 1 is a diagram including functional blocks and shows the configuration of a vehicle in which a drive assist device according to each embodiment of the present invention is installed.

Embodiments of the present invention will be hereinafter described in detail with reference to the drawings. The same or equivalent units, members, etc. in the drawings are given the same reference symbol and will not be described repeatedly.

[1. Configuration of Vehicle V]

FIG. 1 is a diagram including functional blocks and shows the configuration of a vehicle V in which a drive assist device (10) according to each embodiment of the invention is installed. As shown in FIG. 1, the vehicle V is a tractor vehicle for towing a vehicle T to be towed which is a boat trailer or a camping trailer, for example. The vehicle V tows the vehicle T to be towed in a state that a towing 3 that is a connection portion provided in a rear portion of the vehicle V is connected to a counterpart connection portion C that is provided in a front portion of the vehicle T to be towed.

In the vehicle V shown in FIG. 1, part of the configuration other than the functional blocks etc. relating to the drive assist device (10) are omitted.

The vehicle V is equipped with a vehicle body 1, a left front wheel 1FL, a right front wheel 1FR, a left rear wheel 1BL, a right rear wheel 1BR, axles 2F and 2B, the towing 3, a steering angle sensor 4, a rear camera 5, and a car navigation device 6.

The left front wheel 1FL and the right front wheel 1FR are disposed at a front-left position and a front-right position of the vehicle body 1, respectively. The left front wheel 1FL and the right front wheel 1FR are rotated on the axle 2F which is a rotary shaft disposed at a front position of the vehicle body 1. The axle 2F is a drive shaft of the vehicle V and transmits output power of an engine (not shown) to the left front wheel 1FL and the right front wheel 1FR. The left front wheel 1FL and the right front wheel 1FR are wheels to steer the vehicle V and their steering angle is varied according to rotation of a steering wheel (not shown).

The left rear wheel 1BL and the right rear wheel 1BR are disposed at a rear-left position and a rear-right position of the vehicle body 1, respectively. The left rear wheel 1BL and the right rear wheel 1BR are rotated on the axle 2B which is a rotary shaft disposed at a rear position of the vehicle body 1.

The towing 3 is fixed to a rear portion of the vehicle V and connected to a counterpart connection portion C of the vehicle T to be towed. In the embodiment, the attachment position of the towing 3 is on the center line that extends in the front-rear direction of the vehicle V and passes through the center of the vehicle V when the vehicle V is viewed from above. However, the towing 3 may be attached to the vehicle body 1 at a position that is offset from the center line.

The steering angle sensor 4 detects a steering angle β of the left front wheel 1FL and outputs the detected steering angle β to the drive assist device (10).

The rear camera 5 is disposed at a rear position of the vehicle V and shoots a scene in the rear of the vehicle V. More specifically, the rear camera 5 generates an image imB by shooting a scene in a shooting range that includes the towing 3 and outputs the generated image imB to the drive assist device (10).

The car navigation device 6 performs a navigation control, for example, guides a driver (user) of the vehicle V by displaying a route to a destination on a display device 20 by a car navigation control unit (not shown). In a process that the vehicle V is connected to the vehicle T to be towed, the car navigation device 6 generates a synthesized image 50 for assisting the work of connecting the vehicle V and the vehicle T to be towed and displays the generated synthesized image 50 to the display device 20. The details of the synthesized image 50 will be described later.

The car navigation device 6 is equipped with the drive assist device (10) and the display device 20. The drive assist device (10) generates a synthesized image 50 using an image imB taken that is received from the rear camera 5 and outputs the generated synthesized image 50 to the display device 20. The display device 20, which is disposed in a vehicle compartment of the vehicle V, displays the synthesized image 50 that is output from the drive assist device (10). Provided with, on its display screen, a towing mode switch 8 (and a touch switch 9 that is implemented as transparent electrodes), the display device 20 outputs switch information 7 to the drive assist device (10) when the towing mode switch 8 (or touch switch 9) is manipulated by the user.

[2. Configuration of Drive Assist Device 10]

Figure 2:
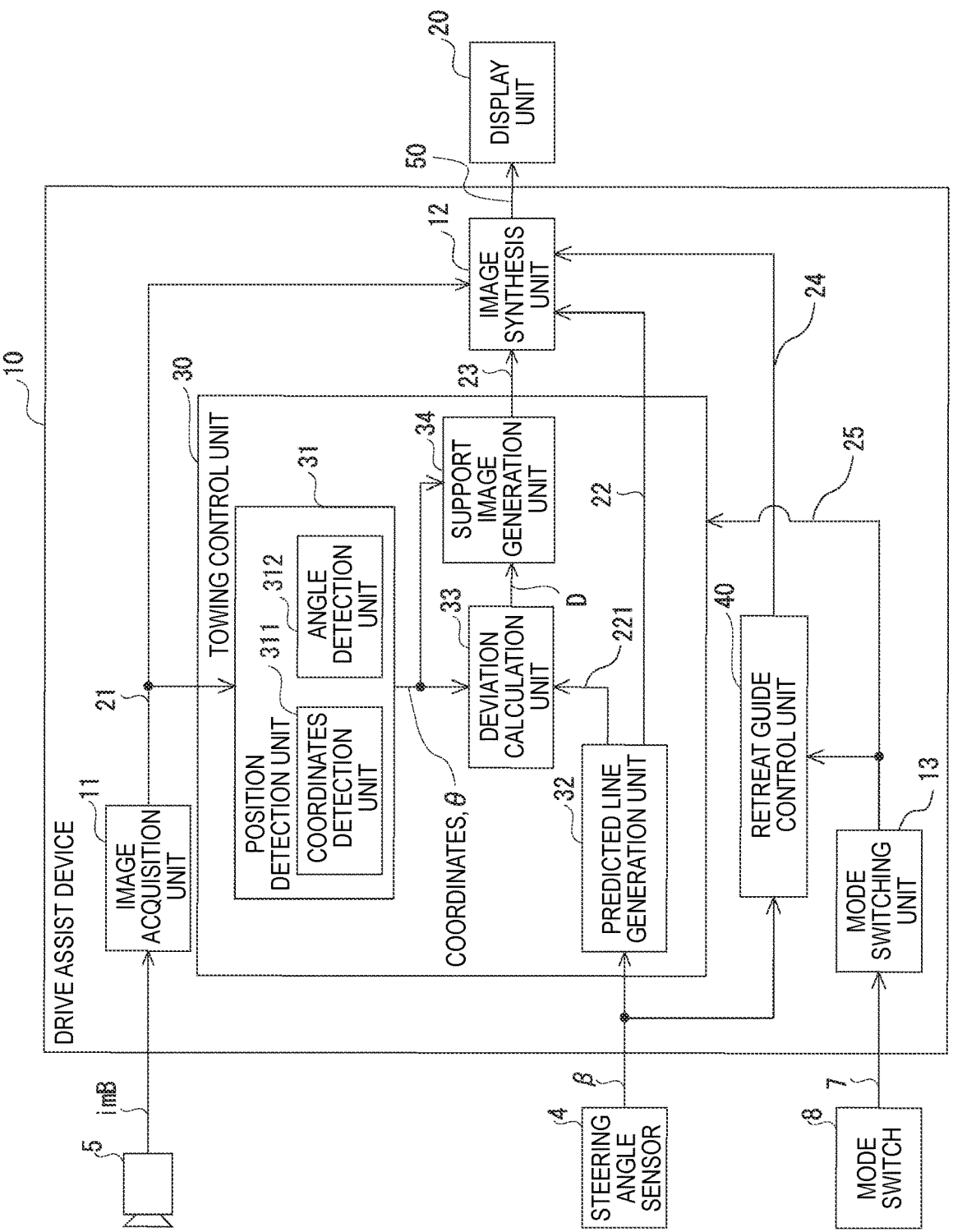
FIG. 2 is a functional block diagram showing the configuration of the drive assist device according to the first embodiment of the invention.

FIG. 2 is a functional block diagram showing the configuration of the drive assist device 10 according to a first embodiment of the invention. As shown in FIG. 2, the drive assist device 10 is equipped with an image acquisition unit 11, an image synthesis unit 12, a mode switching unit 13, a towing control unit 30, and a retreat guide control unit 40.

The image acquisition unit 11 acquires an image imB taken from the rear camera 5 and outputs the acquired image imB to the image synthesis unit 12 on a frame-by-frame basis. In the following, each frame of an image imB taken will be referred to as a "rear frame 21."

The towing control unit 30 starts operating when the drive assist device 10 is set to a towing mode (described later). The towing control unit 30 performs a connection assist control of generating a support image 23 for assisting the user in connecting the towing 3 to the counterpart connection portion C and a predicted line image 22 indicating a predicted course line the towing 3 is expected to follow and outputting them to the image synthesis unit 12. The details of the towing control unit 30 will be described later.

The retreat guide control unit 40 starts operating to perform a retreat guide control when the drive assist device 10 is set to a retreat guide mode (described later). More specifically, the retreat guide control unit 40 acquires shift position information from a shift position sensor (not shown) of the vehicle V. If the acquired shift position information indicates a retreat position, the towing control unit 30 acquires a steering angle β from the steering angle sensor 4. The retreat guide control unit 40 generates a retreat guide image 24 such as predicted progress curves the vehicle V is expected to follow according to the acquired steering angle β.

The image synthesis unit 12 receives each rear frame 21 from the image acquisition unit 11, receives the support image 23 and the predicted line image 22 from the towing control unit 30, and receives the retreat guide image 24 from the retreat guide control unit 40. The image acquisition unit 11 generates a synthesized image 50 by combining the received support image 23 and at least one of the received predicted line image 22 and retreat guide image 24 with the rear frame 21 through superimposition. The synthesized image 50 is output to the display device 20 and displayed thereon.

The mode switching unit 13 acquires manipulation information of the towing mode switch 8 displayed on the display screen of the display device 20. The mode switching unit 13 switches the control mode of the drive assist device 10 to the towing mode or the retreat guide mode according to the acquired manipulation information of the towing mode switch 8. More specifically, when the drive assist device 10 is activated by turning on an ignition switch (not shown) of the vehicle V, the mode switching unit 13 sets the control mode of the drive assist device 10 to the retreat guide mode (initial setting). As a result, the retreat guide control unit 40 is activated and the drive assist device 10 thereafter operates in the retreat guide mode.

Even if the drive assist device 10 is set in the retreat guide mode, the retreat guide control unit 40 does not perform a retreat guide control if the shift position is not at the retreat position. If the shift position is not at the retreat position, the car navigation control unit (not shown) performs a navigation control.

Figure 3:
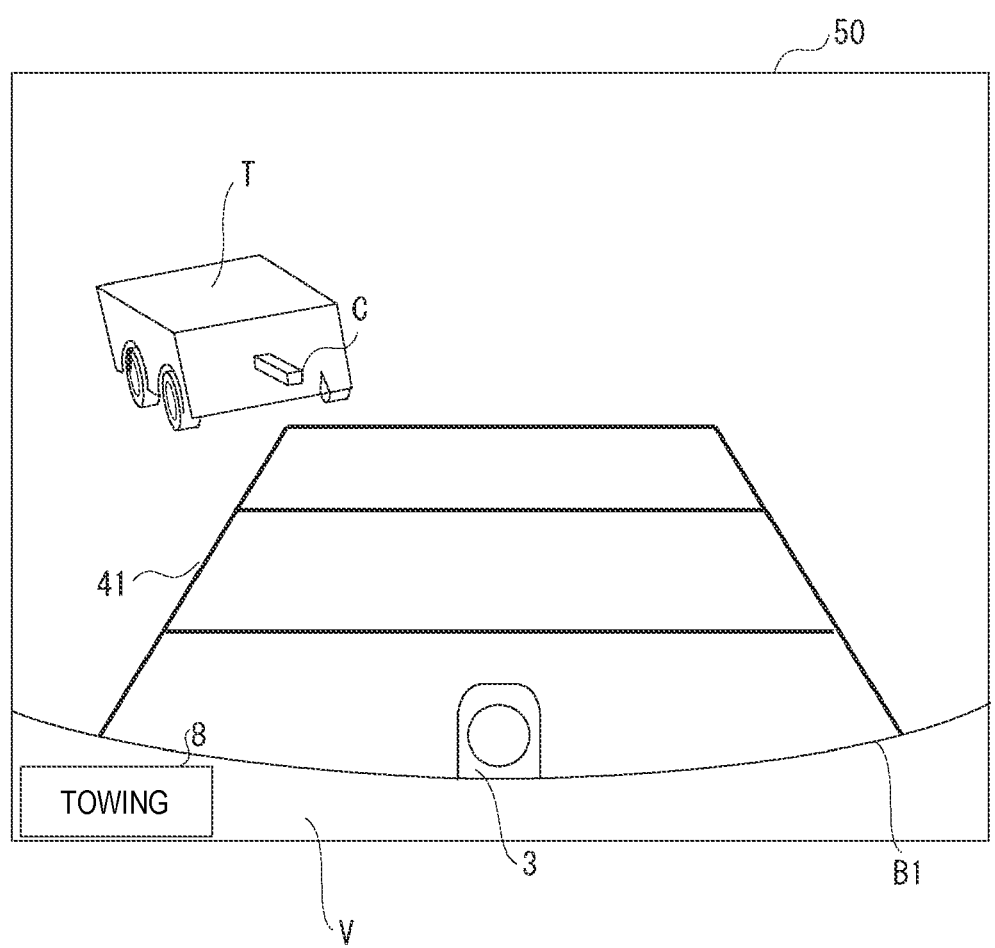
FIG. 3 shows an example synthesized image that is generated when the drive assist device according to the first embodiment of the invention is set in a retreat guide mode.

FIG. 3 shows an example synthesized image 50 that is generated when the drive assist device 10 according to the first embodiment of the invention is set in the retreat guide mode.

FIG. 3 shows a state that each rear frame 21 includes a rear end surface B1 of the vehicle V, the towing 3 that is fixed to the rear end surface B1, and the vehicle T to be towed having the counterpart connection portion C. A retreat guide image 24 including predicted progress curves 41 generated by the retreat guide control unit 40 is combined with each rear frame 21 and a resulting synthesized image 50 is displayed on the display device 20. A towing mode switch 8 is displayed in the synthesized image 50.

The mode switching unit 13 acquires, as switch information 7, manipulation information of the towing mode switch 8 periodically. When detecting that the towing mode switch 8 has been on-manipulated, the mode switching unit 13 switches the control mode of the drive assist device 10 from the retreat guide mode to the towing mode, whereupon the towing control unit 30 is activated. If detecting that the towing mode switch 8 has been on-manipulated again in the towing mode, the mode switching unit 13 switches the control mode of the drive assist device 10 from the towing mode to the retreat guide mode.

Returning to FIG. 2, the towing control unit 30 is equipped with a position detection unit 31, a predicted line generation unit 32, a deviation calculation unit 33, and a support image generation unit 34.

The position detection unit 31 detects a position of the counterpart connection portion C that is provided in the vehicle T and is to be connected to the towing 3. More specifically, the position detection unit 31 acquires each rear frame 21 from the image acquisition unit 11 and detects a position of the counterpart connection portion C, included in the acquired rear frame 21, of the vehicle T to be towed. The position of the counterpart connection portion C includes coordinates with respect to the towing 3 and an angle $\theta$. The angle $\theta$ is an angle that is formed by a front end surface (side surface), provided with the counterpart connection portion C, of the vehicle T to be towed and the rear end surface (side surface) B1, provided with the towing 3, of the vehicle V. Equipped with a coordinates detection unit 311 and an angle detection unit 312, the position detection unit 31 detects a position of the counterpart connection portion C using them.

The coordinates detection unit 311 detects coordinates of the counterpart connection portion C relative to the towing 3 and outputs the detected relative coordinates to the deviation calculation unit 33 and the support image generation unit 34. The angle detection unit 312 detects an angle $\theta$ formed by the front end surface of the vehicle T to be towed and the rear end surface B1 of the vehicle V and outputs the detected angle $\theta$ to the deviation calculation unit 33 and the support image generation unit 34. How to detect a position of the counterpart connection portion C will be described below in a specific manner with reference to FIG. 4.

Figure 4:
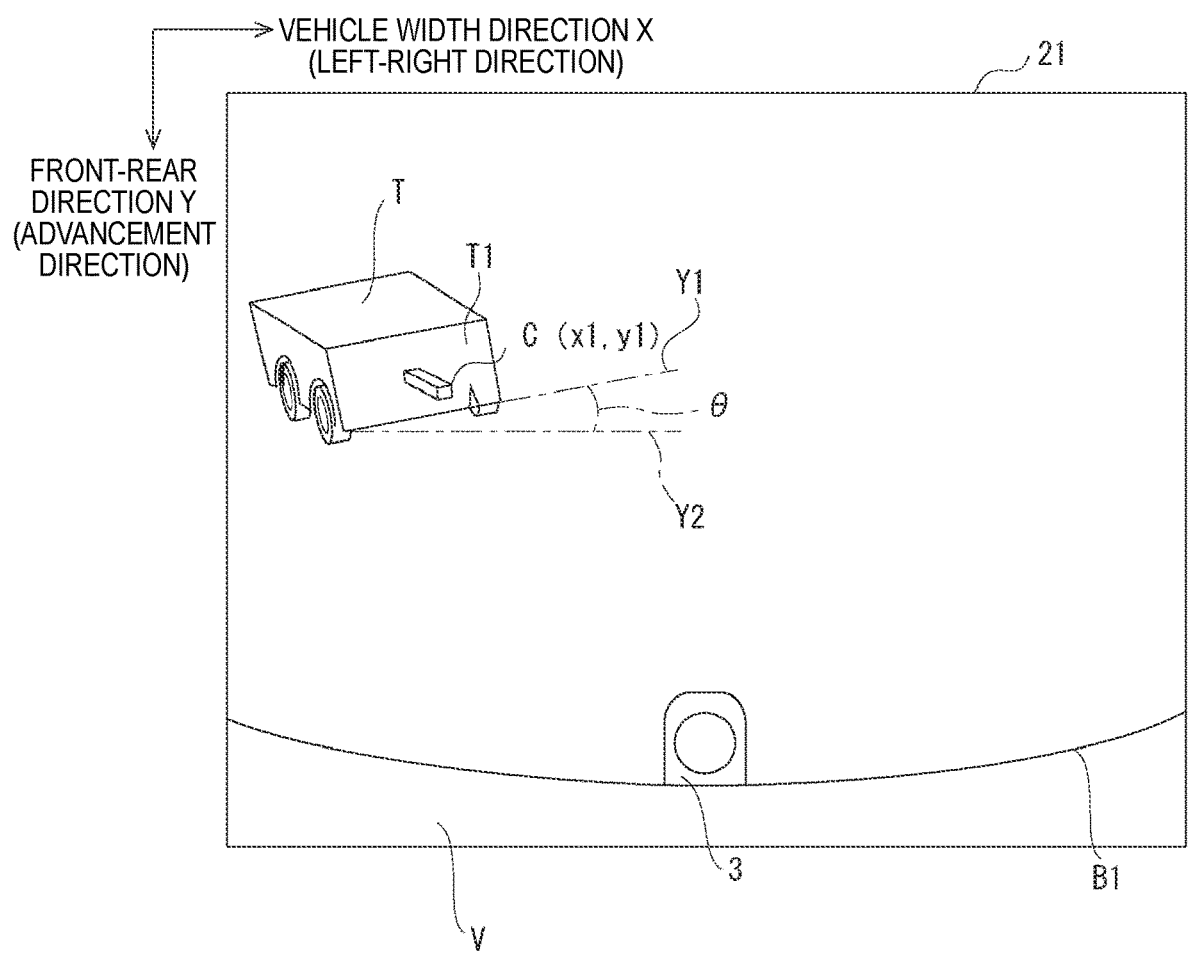
FIG. 4 is a diagram illustrating how a position detection unit employed in the first embodiment of the invention detects a position of a counterpart connection portion.

FIG. 4 is a diagram illustrating how the position detection unit 31 employed in the first embodiment of the invention detects a position of the counterpart connection portion C and is an example rear frame 21 taken by the rear camera 5. The coordinates detection unit 311 detects the counterpart connection portion C existing in the rear frame 21 by performing image recognition such as pattern matching on the basis of the rear frame 21. After detecting the counterpart connection portion C in the rear frame 21, the coordinates detection unit 311 detects a position of the counterpart connection portion C on the basis of its pixel position in the rear frame 21.

More specifically, in a world coordinate system, the X axis is defined as the width direction, that is, the left-right direction, of the vehicle V, the Y axis is defined as the front-rear direction, that is, the advancement direction, of the vehicle V, and the origin is set at the towing 3. With these settings, the coordinates detection unit 311 calculates coordinates (x1, y1) of the counterpart connection portion C relative to the towing 3 in the world coordinate system on the basis of a pixel position of the counterpart connection portion C. In other words, the coordinates detection unit 311 calculates coordinates (x1, y1) of the counterpart connection portion C by converting the coordinates of the counterpart connection portion C in the camera coordinate system in which the origin is set at a prescribed pixel position (e.g., top-left corner pixel position) in the rear frame 21 into sets of coordinates in the world coordinate system.

In detecting a position of the counterpart connection portion C by pattern matching, it is desirable that an image of the vehicle T to be towed including the counterpart connection portion C be stored in a storage device (non-volatile memory) in advance and the coordinates detection unit 311 perform pattern matching using the stored image. This increases the detection accuracy of the counterpart connection portion C.

The angle detection unit 312 detects an angle $\theta$ formed by the front end surface T1 of the vehicle T to be towed and the rear end surface B1 of the vehicle V included in a rear frame 21. More specifically, the angle detection unit 312 detects an angle $\theta$ formed by a first plane that contains the front end surface T1 of the vehicle T to be towed and extends in the vertical direction and a second plane that contains the rear surface B1 of the vehicle V and extends in the vertical direction. More specifically, the angle detection unit 312 detects a bottom end line of the front end surface T1 of the vehicle T to be towed from the rear frame 21 by edge extraction and derives a straight line Y1 that coincides with the bottom end line of the front end surface T1. The straight line Y1 is parallel with a straight line where the plane containing the front end surface T1 of the vehicle T to be towed and extending in the vertical direction crosses the ground.

On the other hand, the angle detection unit 312 derives a straight line Y2 obtained by translating, toward the vehicle T to be towed, a straight line where the plane containing the rear surface B1 of the vehicle V and extending in the vertical direction crosses the ground.

The angle detection unit 312 calculates an angle $\theta$ formed by the thus-derives straight lines Y1 and Y2. This angle $\theta$ is employed as an angle formed by the front end surface T1 of the vehicle T to be towed and the rear end surface B1 of the vehicle V. Since the rear end surface B1 of the vehicle V is parallel with the X axis, the angle detection unit 312 may calculate an angle $\theta$ without deriving a straight line Y2 by detecting an inclination of the straight line Y1 with respect to the X axis. In the following, the angle θ may be referred to as an "angle θ of the vehicle T to be towed."

The method for detecting a position of the counterpart connection portion C is not limited to the method of performing pattern recognition on the basis of a rear frame 21. For example, the position detection unit 31 may detect a position of the counterpart connection portion C using a radar such as a laser radar or a millimeter wave radar.

Returning to FIG. 2, the predicted line generation unit 32 acquires a steering angle β that is output from the steering angle sensor 4, generates a predicted course line 221 that the towing 3 is expected to follow, and outputs it to the image synthesis unit 12 in the form of a predicted line image 22. The predicted line generation unit 32 outputs function information of the predicted course line 221 to the deviation calculation unit 33 as information that is required by the deviation calculation unit 33 to calculate a deviation of the predicted course line 221.

The deviation calculation unit 33 calculates a deviation D between the counterpart connection portion C and the predicted course line 221 in the width direction of the vehicle T to be towed. More specifically, the deviation calculation unit 33 calculates a deviation D on the basis of the coordinates of the counterpart connection portion C, the angle θ of the vehicle T to be towed, and the function information of the predicted course line 221. How to calculate a deviation D will be described below in a specific manner with reference to FIG. 5.

Figure 5:
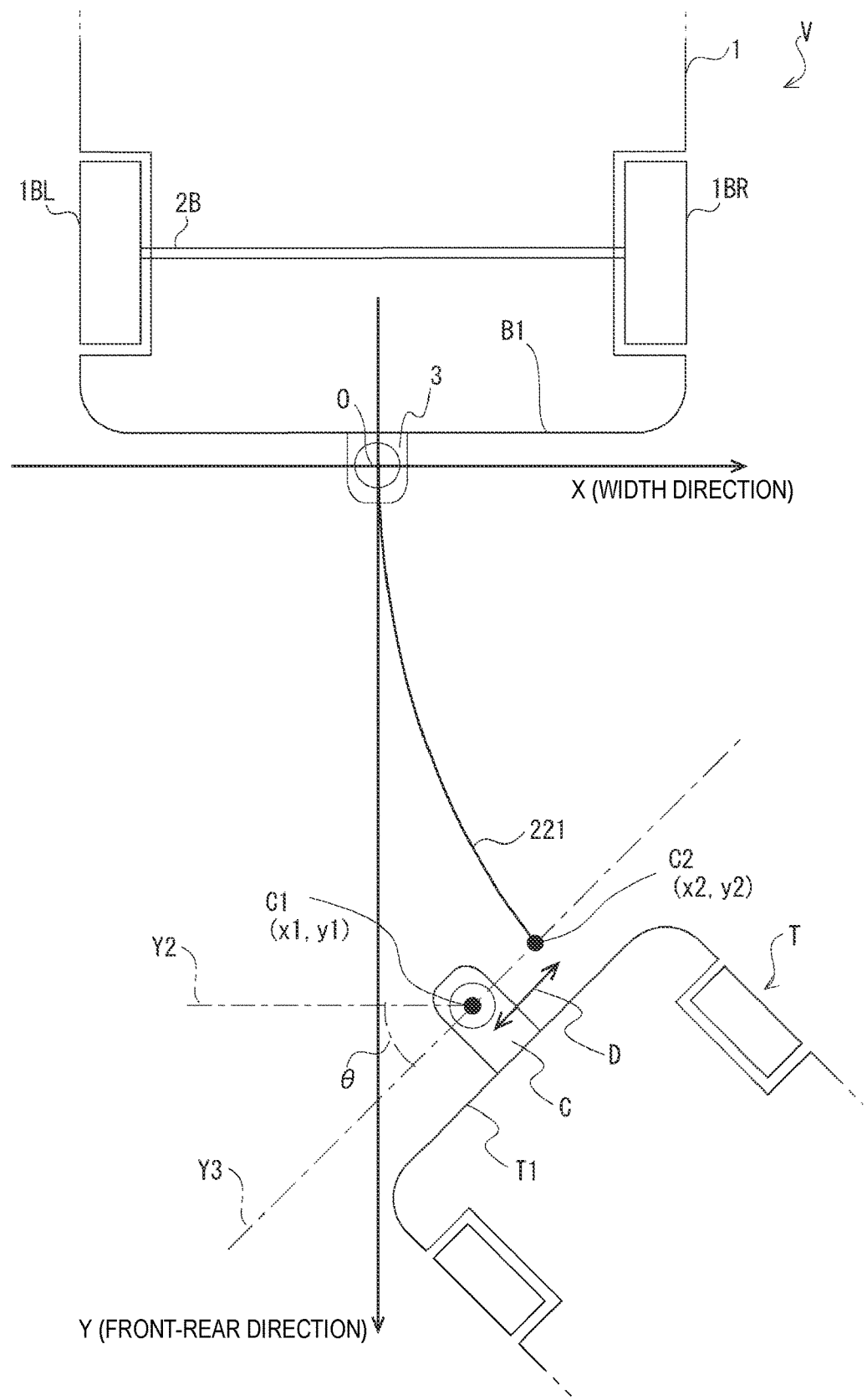
FIG. 5 is a diagram illustrating how a deviation calculation unit employed in the first embodiment of the invention calculates a deviation of a predicted course line.

FIG. 5 is a diagram illustrating how the deviation calculation unit 33 employed in the first embodiment of the invention calculates a deviation D of the predicted course line 221. Two dimensional coordinates shown in FIG. 5 are defined by orthogonal X and Y axes. The X axis passes through the connection center point O of the towing 3 of the vehicle V and extends in the width direction of the vehicle V parallel with its rear end surface B1. The Y axis passes through the connection center point O of the towing 3 and extends in the front-rear direction of the vehicle V. The positive direction of the X axis is the same as the direction from the left rear wheel 1BL to the right rear wheel 1BR of the vehicle V. The positive direction of the Y axis is the same as the direction from the left front wheel 1FL to the left rear wheel 1BL of the vehicle V.

As shown in FIG. 5, the deviation calculation unit 33 sets the coordinates information acquired from the coordinates detection unit 311 as coordinates (x1, y1) of the connection center point C1 of the counterpart connection portion C of the vehicle T to be towed. The deviation calculation unit 33 calculates a straight line Y3 that passes through the connection center point C1 and has an inclination θ on the basis of the angle θ acquired from the angle detection unit 312. The deviation calculation unit 33 calculates coordinates (x2, y2) of an intersecting point C2 between the predicted course line 221 and the straight line Y3 on the basis of the function information of the predicted course line 221 acquired from the predicted line generation unit 32. The deviation calculation unit 33 calculates a distance D between the points C1 and C2 on the basis of the coordinates (x1, y1) of the connection center point C1 and the coordinates (x2, y2) of the intersecting point C2. The distance D is employed as a deviation D between the counterpart connection portion C and the predicted course line 221 in the width direction of the vehicle T to be towed.

The deviation D includes deviation direction information indicating whether the deviation D has a component in the +X direction or the −X direction (see FIG. 5). For example, if the absolute value of the deviation D is equal to 30 cm in the example shown in FIG. 5, since the predicted course line 221 is deviated from the connection center point C1 by 30 cm to the side of the +X direction, the deviation D is written as "30 cm." If the predicted course line 221 is deviated from the connection center point C1 by 30 cm to the side of the −X direction, the deviation D is written as "−30 cm."

Returning to FIG. 2, the deviation calculation unit 33 outputs the calculated deviation D to the support image generation unit 34.

The support image generation unit 34 generates a support image 23 to be used for reducing the deviation D from the value calculated by the deviation calculation unit 33. More specifically, the support image generation unit 34 generates, as a support image 23, an image indicating the deviation D on the basis of the acquired coordinates of the counterpart connection portion C, angle θ of the vehicle T to be towed, and deviation D and outputs the generated support image 23 to the image synthesis unit 12.

Figure 6:
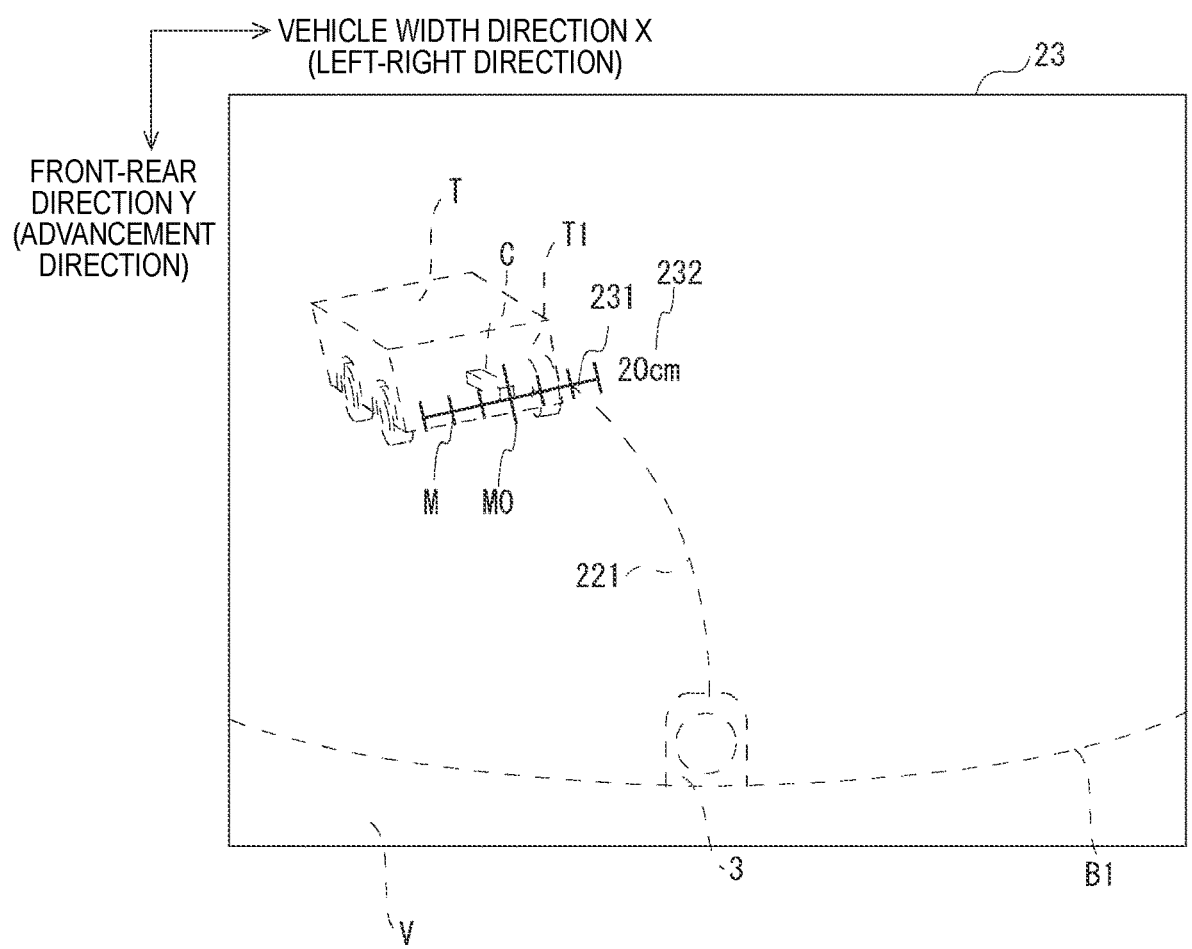
FIG. 6 shows an example support image that is generated in the first embodiment of the invention.

FIG. 6 shows an example support image 23 that is generated in the first embodiment of the invention. In FIG. 6 (support image 23), the towing 3, the rear end surface B1, the predicted course line 221, and the vehicle T to be towed are drawn by broken lines to facilitate understanding of the positional relationships between the towing 3, the vehicle T to be towed, the predicted course line 221, and the support image 23.

The support image 23 consists of a distance line 231 which is in the width direction of the vehicle T to be towed and a deviation numerical value portion 232 indicating the deviation D. The distance line 231 extends from the counterpart connection portion C to both sides in the width direction of the vehicle T to be towed parallel with the front end surface T1 (side surface), provided with the counterpart connection portion C, of the vehicle T to be towed. And the distance line 231 is provided with plural scale marks M. In the example of FIG. 6, the marks M have intervals of 10 cm, for example, and the deviation numerical value portion 232 indicates that the deviation D is equal to 20 cm. A mark M0 at the center of the distance line 231 is a mark indicating a zero deviation position and is longer than the other marks to emphasize that it indicates the zero deviation position. The distance line 231 is adjusted so as to be longer than or equal to the deviation D on this side. As a result, the predicted course line 221 crosses the distance line 231 certainly to allow the user to recognize the deviation D of the predicted course line 221 easily.

It is desirable that the length of the distance line 231 be set shortest in such a range that marks M are shown on both sides of the intersecting point between the distance line 231 and the predicted course line 221. For example, where the deviation D is equal to 25 cm, the distance line 231 may be such that the length of its +X-side portion is 30 cm and marks M are formed at positions of 10 cm, 20 cm, and 30 cm. With this measure, the region where the distance line 231 is combined with the rear frame 21 is made smaller and hence it becomes easier for the user to recognize objects existing around the vehicle T to be towed.

The support image generation unit 34 inclines the distance line 231 by the angle θ with respect to the X axis (left-right direction) on the basis of the angle θ. And the support image generation unit 34 forms the distance line 231 so that the mark M0 of its center is located at the coordinates position of the counterpart connection portion C or its vicinity on the basis of the coordinates information of the counterpart connection portion C. With these measures, the mark M0 indicating the zero deviation position is formed at the counterpart connection portion C and the distance line 231 is formed parallel with the front end surface T1 of the vehicle T to be towed, whereby the user can understand intuitively to what extent the predicted course line 221 is deviated from the counterpart connection portion C. In addition, since only one distance line 231 suffices, the amount of information of the support image 23 indicating a deviation D can be made small. As a result, the region where the support image 23 is combined with the rear frame 21 is made smaller and hence it becomes easier for the user to see the neighborhood, included in the rear frame 21, of the vehicle T to be towed.

Figure 7:
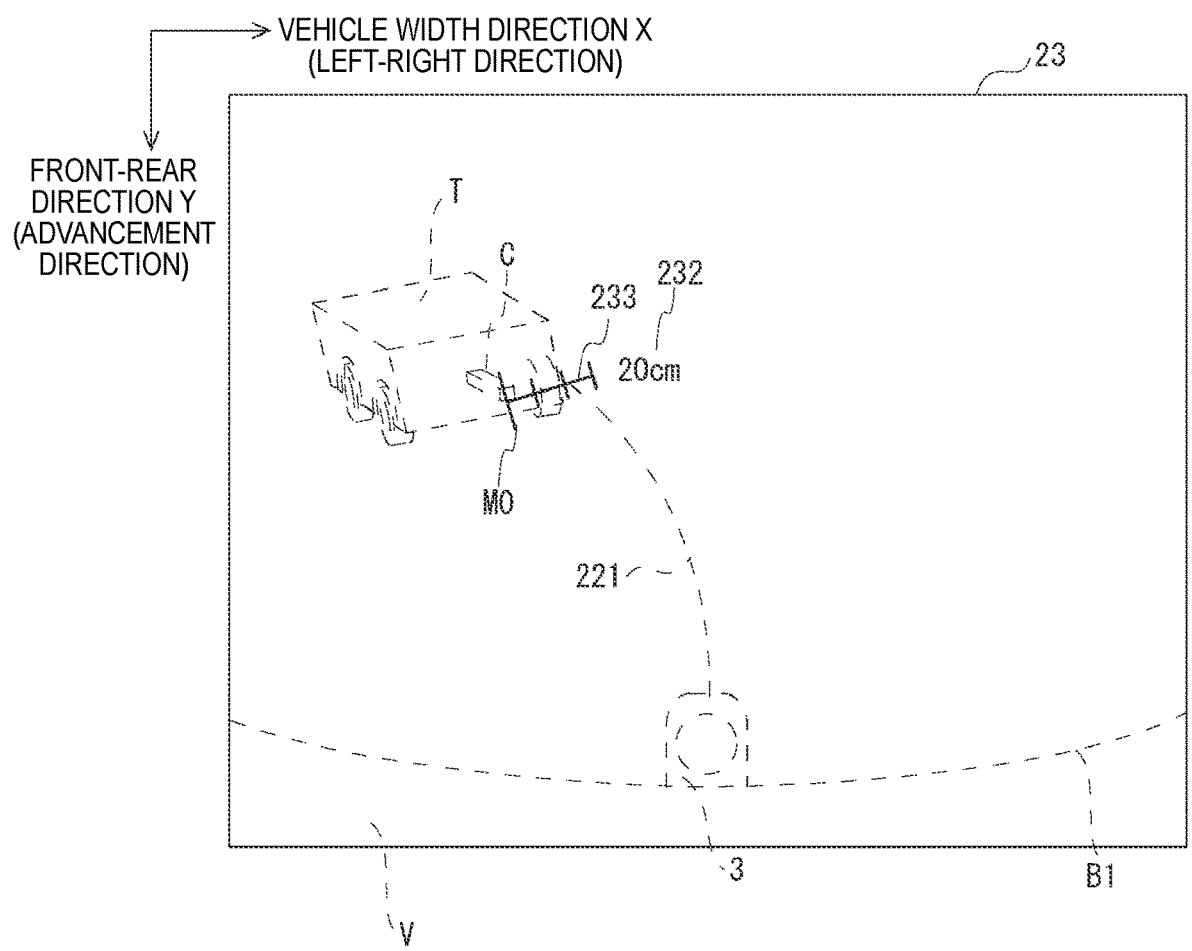
FIG. 7 shows another example support image that is generated in the first embodiment of the invention.

FIG. 7 shows another example of the support image 23 employed in the first embodiment of the invention. In in FIG. 7 (support image 23), as in FIG. 6, the towing 3, the rear end surface B1, the predicted course line 221, and the vehicle T to be towed are drawn by broken lines to facilitate understanding of the positional relationships between the towing 3, vehicle T to be towed, the predicted course line 221, and the support image 23.

The support image 23 shown in FIG. 7 consists of a deviation numerical value portion 232 and a distance line 233 that extends from a position (start point) corresponding to the counterpart connection portion C in a direction in which the predicted course line 221 is deviated from the counterpart connection portion C. More specifically, the support image 23 has the distance line 233 that extends from a mark M0 (start point) formed at the coordinates position of the counterpart connection portion C or its vicinity and indicating a zero deviation position and extends only in the direction in which the predicted course line 221 is deviated from the counterpart connection portion C. The distance line 233 is formed in the same manner as the above-described distance line 231 in the other points. In the example of FIG. 7, since the predicted course line 221 is deviated from the counterpart connection portion C rightward, the distance line 233 is formed only on the right side of the counterpart connection portion C. If the predicted course line 221 is deviated from the counterpart connection portion C leftward, the distance line 233 is formed only on the left side of the counterpart connection portion C.

Where the predicted course line 221 is deviated from the counterpart connection portion C rightward, the portion, located on the left side of the counterpart connection portion C, of the distance line 231 (see FIG. 6) is low in necessity for the purpose of notifying the user of a deviation D and, contrary to the intention, may make the deviation D less recognizable. In contrast, the distance line 233 shown in FIG. 7 has no portion on the side opposite to the side of the deviation, that is, exists only on the side of the deviation. This makes a synthesized image 50 easier to see when it is displayed.

[3. Operation of Drive Assist Device 10]
[3.1. Outline of Operation]

To connect the vehicle V to the vehicle T to be towed, the user of the vehicle V instructs the car navigation device 6 to display a connection assist picture by on-manipulating the towing mode switch 8 (see FIG. 3) being displayed on the display device 20 of the car navigation device 6. When detecting turning-on of the towing mode switch 8, the mode switching unit 13 switches the control mode of the drive assist device 10 from the retreat guide mode to the towing mode. As a result, the towing control unit 30 is activated to start generation of a support image 23 for support of connection work and a synthesized image 50 is displayed on the display device 20 as a connection assist picture.

Figure 8:
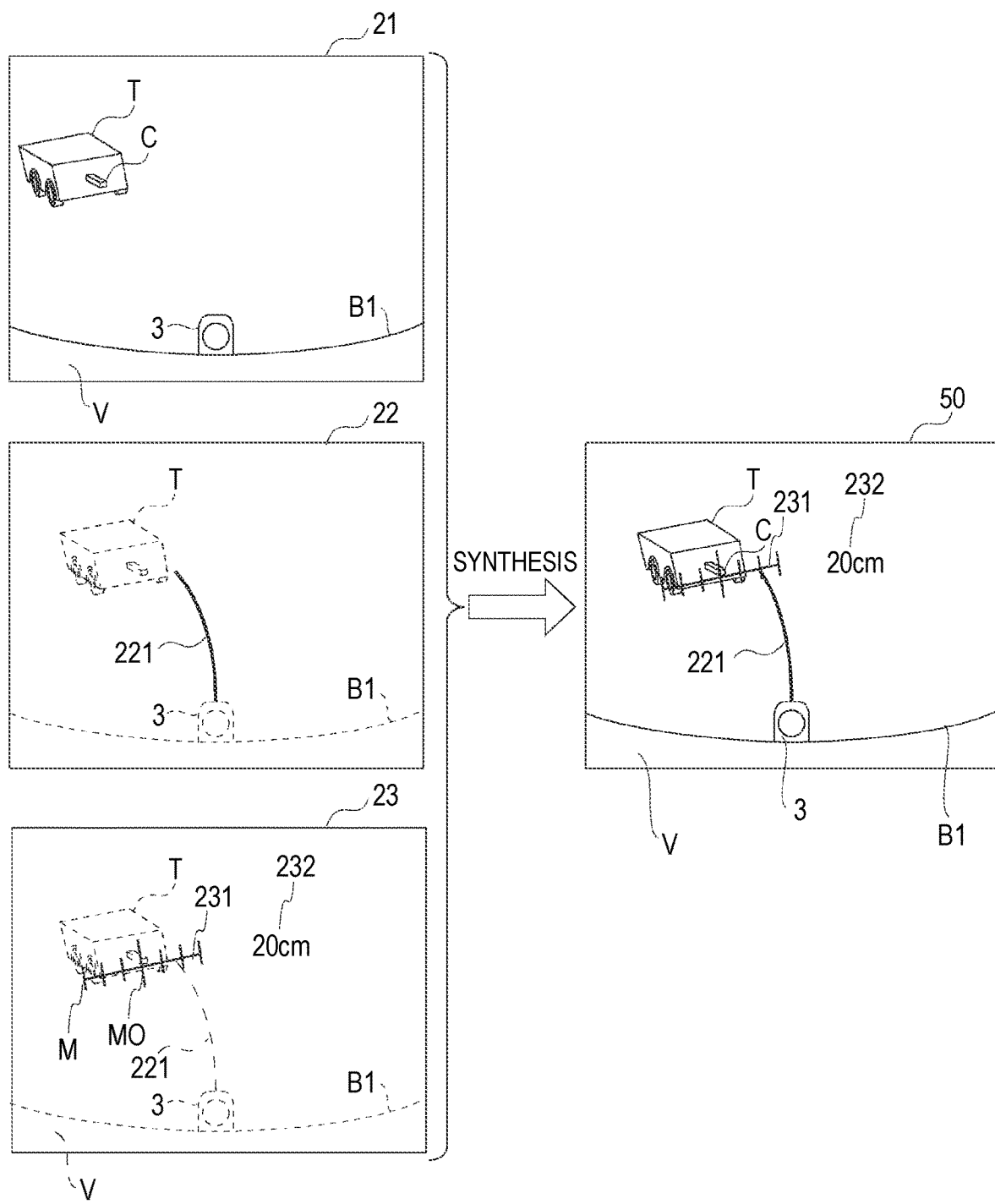
FIG. 8 is a diagram illustrating an operation of the drive assist device according to the first embodiment of the invention.

FIG. 8 is a diagram illustrating an operation of the drive assist device 10 according to the first embodiment of the invention. As shown in FIG. 8, the image acquisition unit 11 acquires an image imB taken from the rear camera 5. In the first embodiment, the image imB is a moving image consisting of plural rear frames 21.

In a rear frame 21 shown in FIG. 8, subjects other than the vehicle T to be towed and the rear end surface B1 of the vehicle V are omitted. Also in similar drawings other than FIG. 8, subjects other than the vehicle T to be towed and the rear end surface B1 of the vehicle V may be omitted.

The predicted line generation unit 32 acquires a steering angle $\beta$ that is output from the steering angle sensor 4 and generates a predicted course line 221 of the towing 3 according to the acquired steering angle $\beta$. The predicted line generation unit 32 outputs an image including the predicted course line 221 to the image synthesis unit 12 as a predicted line image 22 and outputs function information of the predicted course line 221 to the deviation calculation unit 33. In the middle-left part of FIG. 8 (predicted line image 22), the towing 3, the rear end surface B1, and the vehicle T to be towed are drawn by broken lines to facilitate understanding of the positional relationships between the towing 3, vehicle T to be towed, the predicted course line 221.

The coordinates detection unit 311 detects coordinates of the counterpart connection portion C of the vehicle T to be towed included in a rear frame 21 and the angle detection unit 312 detects an angle $\theta$ of the vehicle T to be towed included in the rear frame 21.

The deviation calculation unit 33 calculates a deviation D between the counterpart connection portion C and the predicted course line 221 in the width direction of the vehicle T to be towed on the basis of the coordinates of the counterpart connection portion C, the angle $\theta$ of the vehicle T to be towed, and the function information of the predicted course line 221 by the technique described above with reference to FIG. 5.

The support image generation unit 34 generates a support image 23 that consists of a distance line 231 and a deviation numerical value portion 232 on the basis of the coordinates of the counterpart connection portion C, the angle $\theta$ of the vehicle T, and the deviation D.

The image synthesis unit 12 generates a synthesized image 50 by superimposing the predicted line image 22 generated by the predicted line generation unit 32 and the support image 34 generated by the support image generation unit 34 on a rear frame 21 acquired by the image acquisition unit 11. The synthesized image 50 is output to and displayed on the display device 20 as a connection assist picture.

[3.2. Details of Operation]

Figure 9:
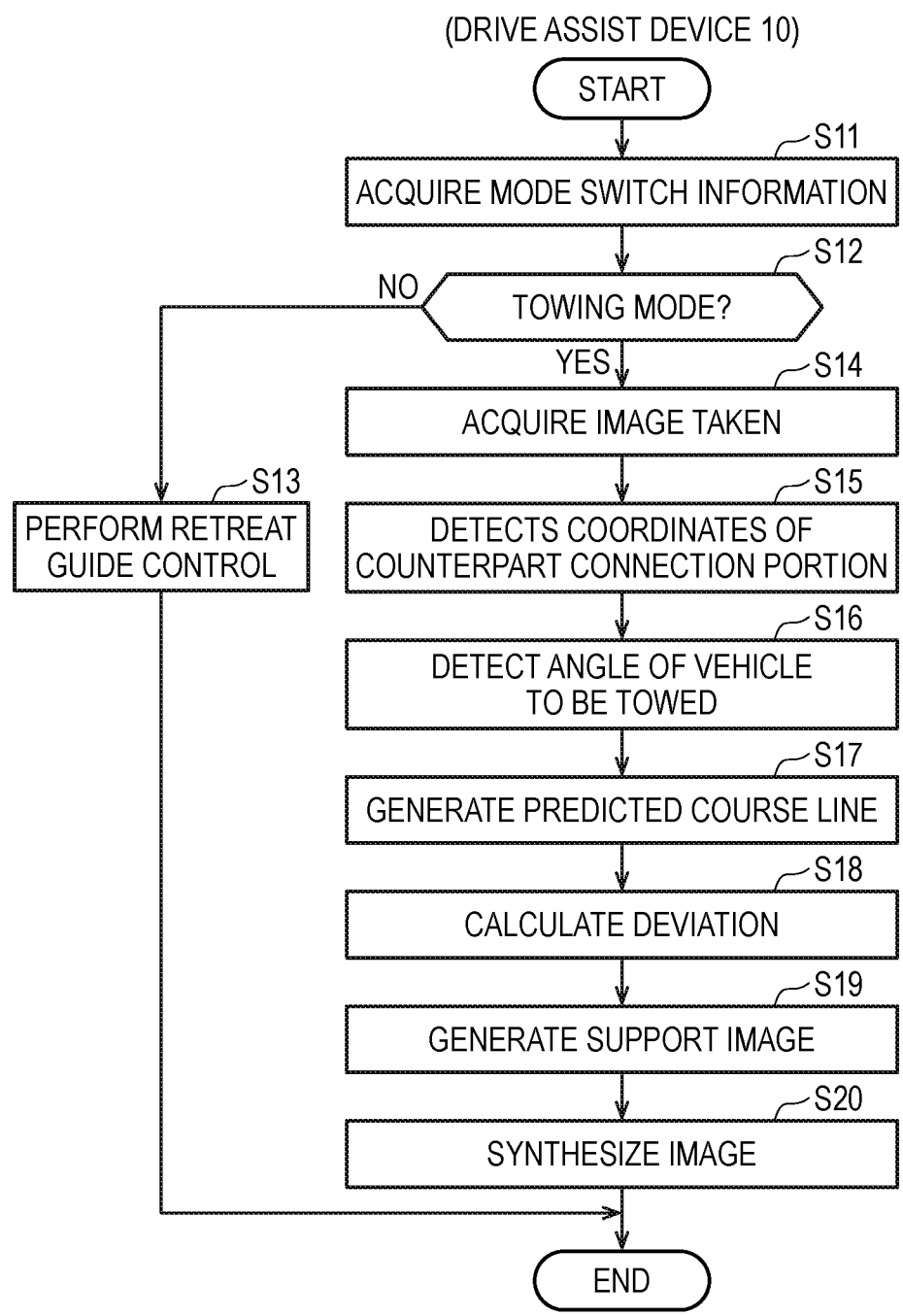
FIG. 9 is a flowchart showing an operation of the drive assist device according to the first embodiment of the invention.

FIG. 9 is a flowchart showing an operation of the drive assist device 10 according to the first embodiment of the invention. When starting to be supplied with power by turning on the ignition switch (not shown), the drive assist device 10 executes the process shown in FIG. 9 on a regular basis.

At step S11, the mode switching unit 13 acquires manipulation information of the towing mode switch 8 and judges whether the towing mode switch 8 has been turned on on the basis of the acquired manipulation information. If the towing mode switch 8 is off, the mode switching unit 13 sets a mode flag stored in a memory (not shown) at "0." The mode flag "0" indicates that the control mode of the drive assist device 10 is the retreat guide mode. If the towing mode switch 8 has been turned on, the mode switching unit 13 sets the mode flag at "1." The mode flag "1" indicates that the control mode of the drive assist device 10 is the towing mode. From this time onward, the mode switching unit 13 switches the mode flag to "0" or "1" alternately every time the towing mode switch 8 is manipulated.

At step S12, the mode switching unit 13 judges whether the control mode is the towing mode by judging the state of the mode flag. If judging that the control mode is the retreat guide mode rather than the towing mode (S12: no), the mode switching unit 13 activates the retreat guide control unit 40. At step S13, the retreat guide control unit 40 performs a retreat guide control.

At step S13, if not detecting that the shift position (not shown) is the retreat position, the retreat guide control unit 40 finishes the execution of step S13 without performing a retreat guide control. If detecting that the shift position is the retreat position, the retreat guide control unit 40 generates a retreat guide image 24 including predicted progress curves 41 and outputs it to the image synthesis unit 12. The image synthesis unit 12 combines the retreat guide image 24 with a rear frame 21 and outputs a resulting synthesized image 50 to the display unit 20. As a result, the synthesized image 50 for retreat guidance is displayed as shown in FIG. 3 and retreat assistance is made.

If judging that the control mode is the towing mode (S12: yes), the mode switching unit 13 activates the towing control unit 30. The towing control unit 30 executes step S14 and the following steps (connection assist control).

At step S14, the coordinates detection unit 311 acquires a rear frame 21 from the image acquisition unit 11. At step S15, the coordinates detection unit 311 detects coordinates of the counterpart connection portion C of the vehicle T to be towed relative to the towing 3. The coordinates detection unit 311 outputs the detected coordinates information to the deviation calculation unit 33 and the support image generation unit 34.

At step S16, the angle detection unit 312 detects an angle θ of the vehicle T to be towed formed by the front end surface T1 of the vehicle T to be towed and the rear end surface B1 of the vehicle V on the basis of a rear frame 21. The angle detection unit 312 outputs the detected angle θ to the deviation calculation unit 33 and the support image generation unit 34.

At step S17, the predicted line generation unit 32 acquires a steering angle β from the steering angle sensor 4 and generates a predicted course line 221 of the towing 3 according to the acquired steering angle β. The predicted line generation unit 32 outputs the predicted course line 221 to the image synthesis unit 12 as a predicted line image 22 and outputs function information of the predicted course line 221 to the deviation calculation unit 33.

At step S18, the deviation calculation unit 33 calculates a deviation D between the counterpart connection portion C and the predicted course line 221 in the width direction of the vehicle T to be towed on the basis of the coordinates of the counterpart connection portion C, the angle θ of the vehicle T to be towed, and the function information of the predicted course line 221 by the technique described above with reference to FIG. 5 and outputs the calculated deviation D to the support image generation unit 34.

At step S19, the support image generation unit 34 generates an image showing the deviation D as a support image 23 on the basis of the coordinates of the counterpart connection portion C, the angle of the vehicle T to be towed, and the deviation D and outputs the generated image to the image synthesis unit 12.

At step S20, the image synthesis unit 12 generates a synthesized image 50 by superimposing the support image 23 and the predicted course line 221 on a rear frame 21 and outputs the generated synthesized image 50 to the display device 20.

As a result, since as described above with reference to FIG. 8 the connection assist synthesized image 50 is displayed on the display device 20, the user can recognize, quantitatively and intuitively, the current steering angle and the deviation D of the counterpart connection portion C by seeing the connection assist synthesized image 50 displayed on the display unit 20. This makes it easier for the user to recognize in what direction and to what extent he or she should rotate the steering wheel.

As described above, the first embodiment of the invention provides the drive assist device 10 which is installed in the tractor vehicle V having the connection portion 3 to be connected to the vehicle T to be towed. The drive assist device 10 is equipped with the image acquisition unit 11 which acquires an image taken from the camera 5 that shoots a scene in a shooting range including the connection portion 3; the position detection unit 31 which detects a position of the counterpart connection portion C, to be connected to the connection portion 3, of the vehicle T to be towed; the predicted line generation unit 32 which generates a predicted course line 221 that the connection portion 3 is expected to follow on the basis of a steering angle θ of the tractor vehicle V; the deviation calculation unit 33 which calculates a deviation D between the counterpart connection portion C and the predicted course line 221 in the width direction of the vehicle T to be towed on the basis of the position of the counterpart connection portion C and the predicted course line 221; the support image generation unit 34 which generates a support image 23 to be used for reducing the deviation D calculated by the deviation calculation unit 33; and the image synthesis unit 12 which generates a synthesized image 50 by combining the predicted course line 221 and the support image 23 with the image taken and outputs the generated synthesized image 50 to the display device 20.

This drive assist device 10 allows the user of the tractor vehicle V can easily connect the tractor vehicle V to the vehicle T to be towed.

In the drive assist device 10 according to the first embodiment, the support image generation unit 34 generates an image indicating the deviation D as the support image 23.

This measure allows the user to recognize a deviation D between the predicted course line 221 and the counterpart connection portion C quantitatively and intuitively.

In the drive assist device 10 according to the first embodiment, the support image 23 is a distance line 231 that extends from the counterpart connection portion C in the width direction of the vehicle T to be towed parallel with the vehicle body side surface T1, provided with the counterpart connection portion C, of the vehicle T to be towed.

This measure allows the user to recognize a deviation D between the predicted course line 221 and the counterpart connection portion C quantitatively and intuitively.

In the drive assist device 10 according to the first embodiment, the distance line is a distance line 233 that extends from a start point corresponding to the counterpart connection portion C in a direction in which the predicted course line 221 is deviated from the counterpart connection portion C.

With this measure, a synthesized image 50 is easier to see when it is displayed because the distance line 233 has no portion on the side opposite to the side of the deviation of the predicted course line 221, that is, exists only on the side of the deviation.

In the drive assist device 10 according to the first embodiment, the support image 23 is an image including a numerical value representing the deviation D.

This measure allows the user to recognize the deviation D correctly.

[4. Second Embodiment]

Figure 10:
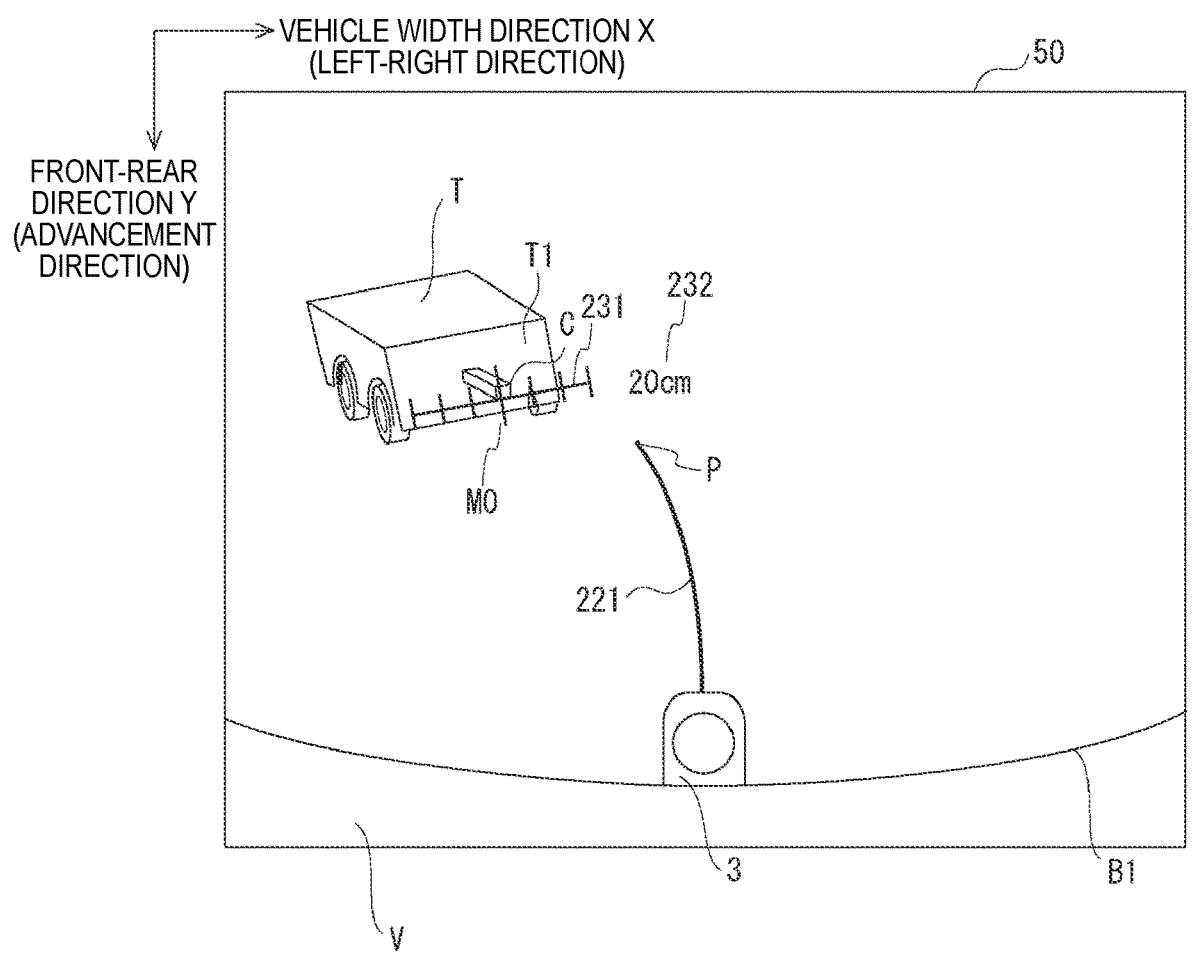
FIG. 10 is a diagram showing a synthesized image generated in the first embodiment of the invention and illustrating a concern.

In the above-described first embodiment, the support image generation unit 34 causes the distance line 231 to be displayed at the position of or adjacent to the counterpart connection portion C. On the other hand, the predicted course line 221 has a preset length. Thus, when as shown in FIG. 10 the distance between the vehicle T to be towed and the tractor vehicle V is greater than the length of the predicted course line 221, an end point P, farthest from the vehicle V, of the predicted course line 221 does not reach the distance line 231. In this case, an intersecting point of the predicted course line 221 and the distance line 231 is unknown and it is difficult for the user to recognize a deviation of the predicted course line 221 intuitively.

A second embodiment is intended to make an improvement in this point, that is, to allow the user to recognize a deviation of the predicted course line 221 intuitively even in the case where the distance between the vehicle T to be towed and the tractor vehicle V is greater than the length of the predicted course line 221.

[4.1. Configuration of Drive Assist Device 10A]

Figure 11:
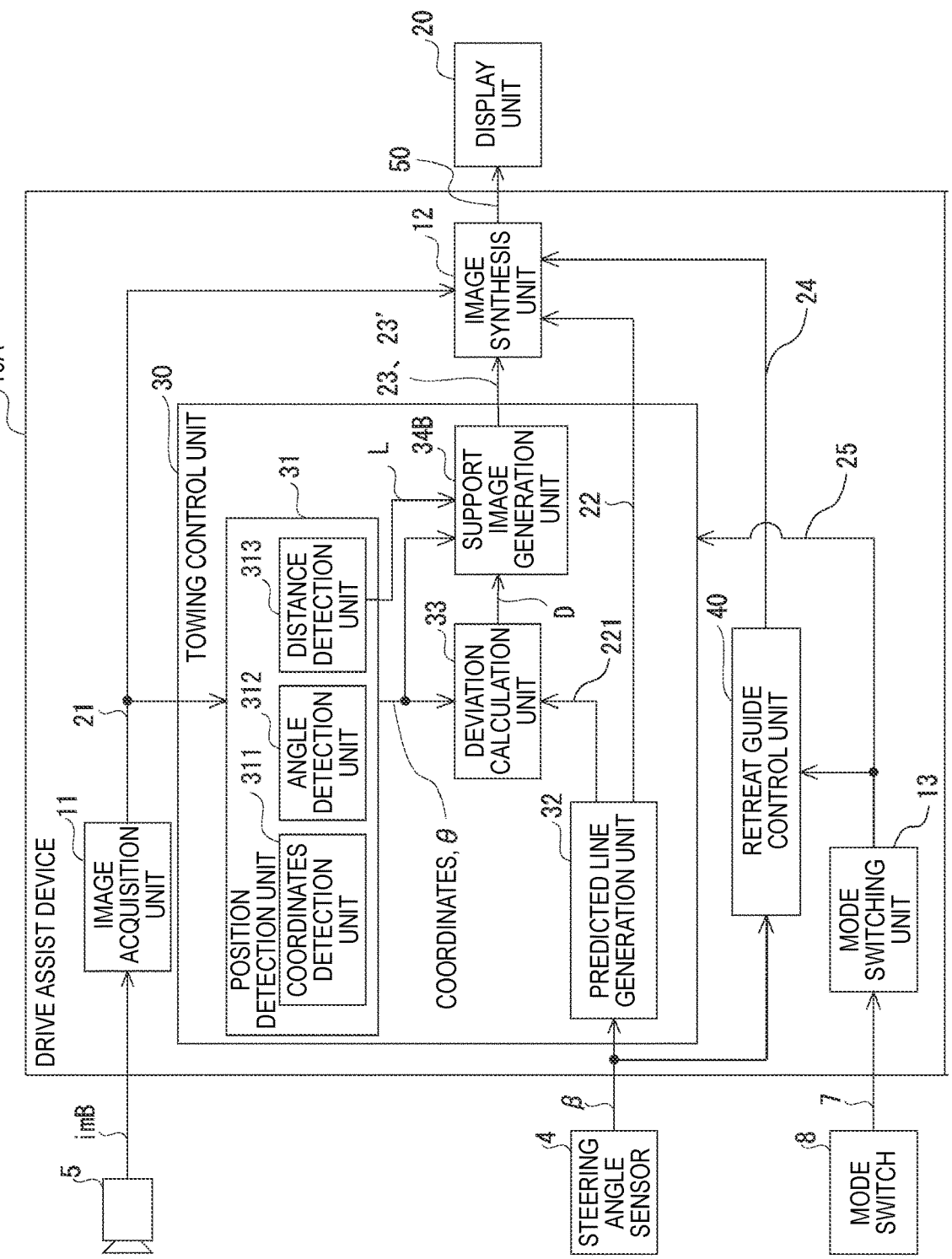
FIG. 11 is a functional block diagram showing the configuration of a drive assist device according to a second embodiment of the invention.

FIG. 11 is a functional block diagram showing the configuration of a drive assist device 10A according to a second embodiment of the invention. In FIG. 11, units, members, etc. having the same or equivalent ones in FIG. 2 are given the same reference symbols as the latter and will not be described redundantly. As shown in FIG. 11, the position detection unit 31 is equipped with a distance detection unit 313. A support image generation unit 34B generates a support image by a different method than the support image generation unit 34 shown in FIG. 2.

The distance detection unit 313 measures a distance between the tractor vehicle V and the vehicle T to be towed. More specifically, the distance detection unit 313 detects a distance L from the towing 3 to the counterpart connection portion C on the basis of coordinates of the counterpart connection portion C calculated by the coordinates detection unit 311 and outputs the detected distance L to the support image generation unit 34. In the second embodiment, since it suffices that the distance L and the length of a predicted course line 221 be compared with each other in a synthesized image 50, the coordinates detection unit 311 outputs coordinates in the camera coordinate system to the distance detection unit 313 as coordinates of the counterpart connection portion C. The distance detection unit 313 detects a distance L in the camera coordinate system on the basis of the coordinates of the counterpart connection portion C in the camera coordinate system.

The support image generation unit 34B generates a support image according to the distance L. More specifically, the support image generation unit 34B compares the distance L with the length of the predicted course line 221 and generates a support image in different display forms when the length of the predicted course line 221 is shorter than the distance L and when the length of the predicted course line 221 is greater than or equal to the distance L. In the second embodiment, the support image generation unit 34B changes the display form of a distance line 231 according to the relationship between the distance L and the length of the predicted course line 221. Since the length of a predicted course line 221 is set in advance, information indicating the length of a predicted course line 221 is stored in a nonvolatile memory (not shown) as a fixed value. The support image generation unit 34B acquires the length information of the predicted course line 221 from the nonvolatile memory.

Even more specifically, if the length of the predicted course line 221 is greater than or equal to the distance L, the support image generation unit 34B generates a support image 23 including the distance line 231 shown in FIG. 6 or the distance line 233 shown in FIG. 7 by performing the same processing as the support image generation unit 34 shown in FIG. 2 does. In the following, in this embodiment, a description will be made with an assumption that the support image generation unit 34B generates the distance line 231 as shown in FIG. 6 which is displayed at the position of the counterpart connection portion C. Since the predicted course line 221 necessarily intersects the distance line 231, the user can recognize a deviation D of the predicted course line 221 certainly. In the following, the distance line 231 may be referred to as a "first distance line 231" and a support image including the first distance line 231 may be referred to as a "first support image 23."

If the length of the predicted course line 221 is shorter than the distance L, the support image generation unit 34B generates a distance line 234 having a different display form than the distance line 231 by changing the position and the size. How to generate a support image in a case that the length of the predicted course line 221 is shorter than the distance L will be described with reference to FIG. 12.

Figure 12:
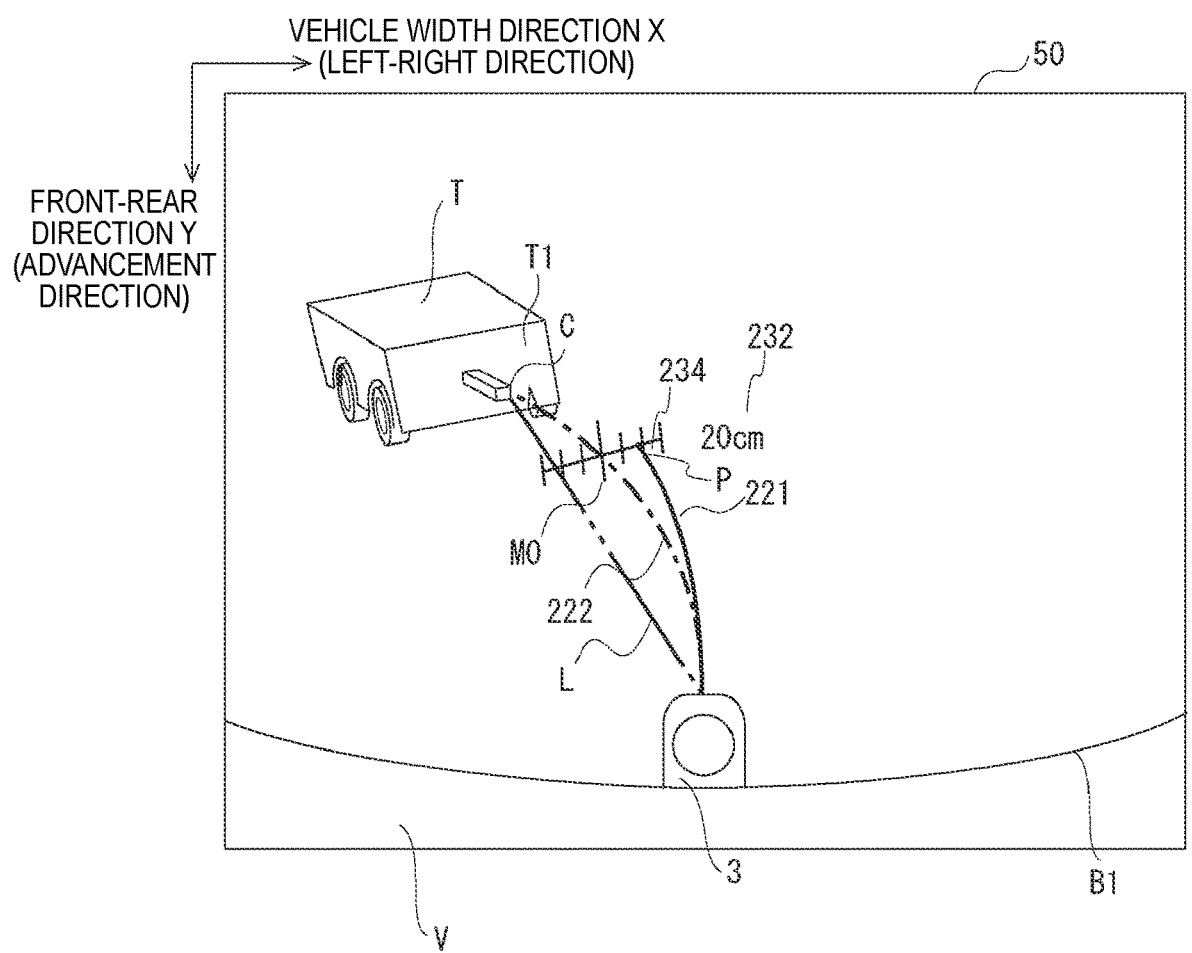
FIG. 12 is a diagram showing a synthesized image generated in the second embodiment of the invention.

FIG. 12 is a diagram showing a synthesized image 50 generated in the second embodiment of the invention. In FIG. 12, a predicted course line 222 whose deviation from the counterpart connection portion C is equal to 0 is shown imaginarily by a chain line and the distance L between the towing 3 and the counterpart connection portion C is shown imaginarily by a two-dot chain line.

Where the length of the predicted course line 221 is shorter than the distance L, as shown in FIG. 12 the end point P of the predicted course line 221 does not reach the vehicle T to be towed. Thus, where the length of the predicted course line 221 is shorter than the distance L, the support image generation unit 34B generates a distance line 234 so that it crosses the predicted course line 221. More specifically, the support image generation unit 34B generates a distance line 234 so that it crosses the predicted course line 221 and has it displayed on the predicted course line 221. Furthermore, the support image generation unit 34B has a deviation numerical value portion 232 (indicating the deviation D) displayed in the vicinity of the distance line 234. FIG. 12 shows a state that the support image generation unit 34B has placed the distance line 234 at such a position that it crosses the predicted course line 221 at its end point P.

The support image generation unit 34B inclines the distance line 234 by the angle θ with respect to the X axis which is the left-right direction on the basis of the angle θ like the distance line 231 is inclined in FIG. 6. That is, like the distance line 231, the distance line 234 is formed parallel with the front end surface T1 of the vehicle T to be towed. Furthermore, the support image generation unit 34B places a mark M0, indicating a zero deviation position, of the distance line 234 on the predicted course line 222 whose deviation is equal to 0.

Furthermore, since as shown in FIG. 12 the interval in the left-right direction between the predicted course line 221 and the predicted course line 222 whose deviation is equal to 0 becomes smaller as the position comes closer to the vehicle V, the support image generation unit 34B adjusts the scale of the distance line 234 in the left-right direction according to the location of the distance line 234. More specifically, the support image generation unit 34B adjusts the scale of the distance line 234 so that the intersecting point (point P in FIG. 12) between the predicted course line 221 and the distance line 234 has a value that is equal to a deviation (e.g., 20 cm) on the distance line 234. Even more specifically, the support image generation unit 34B adjusts the scale of the distance line 234 in the left-right direction so that the interval of marks of the distance line 234 becomes shorter as the location of the distance line 234 comes closer to the vehicle V. Although the distance line 234 may be placed at any location where it crosses the predicted course line 221, it is desirable that the distance line 234 be placed at such a location as to cross the end point P of the predicted course line 221 because the interval of the marks of the distance line 234 is longest and hence easiest to see when the distance line 234 is placed at the location corresponding to the end point P. In the following, the distance line 234 may be referred to as a "second distance line 234" and a support image including the second distance line 234 may be referred to as a "second support image 23'."

In the above-described manner, the support image generation unit 34B generates one of a first distance line 231 and a second distance line 234 that are different from each other in display form depending on the distance L. The support image generation unit 34B outputs a first support image 23 having the first distance line 231 or a second support image 23' having the second distance line 234 to the image synthesis unit 12.

Although in the above-described second embodiment the support image generation unit 34B generates a support image in which the display form of a distance line is changed according to the distance L, the support image generation unit 34B may generate a support image in which the length of the predicted course line 221 is changed according to the distance L. In this case, referring to FIG. 11, the predicted line generation unit 32 outputs a predicted line image 22 to the support image generation unit 34B rather than the image synthesis unit 12. The support image generation unit 34B outputs an image including a distance line 231 and a predicted course line 221 to the image synthesis unit 12 as a support image.

More specifically, if the length of the predicted course line 221 is longer than or equal to the distance L, the support image generation unit 34B generates, as a first support image 23, an image including a distance line 231 as shown in FIG. 6 and a predicted course line 221 received from the predicted line generation unit 32. If the length of the predicted course line 221 is shorter than the distance L, the support image generation unit 34B elongates the predicted course line 221 so that it crosses the distance line 231 as shown in FIG. 6. The support image generation unit 34B generates a distance line 231 as shown in FIG. 6 and an elongated predicted course line 221 as a second support image 23'. The image synthesis unit 12 combines the first support image 23 or the second support image 23' with a rear frame 21 and outputs a synthesized image to the display device 20.

[4.2. Details of Operation]

Figure 13:
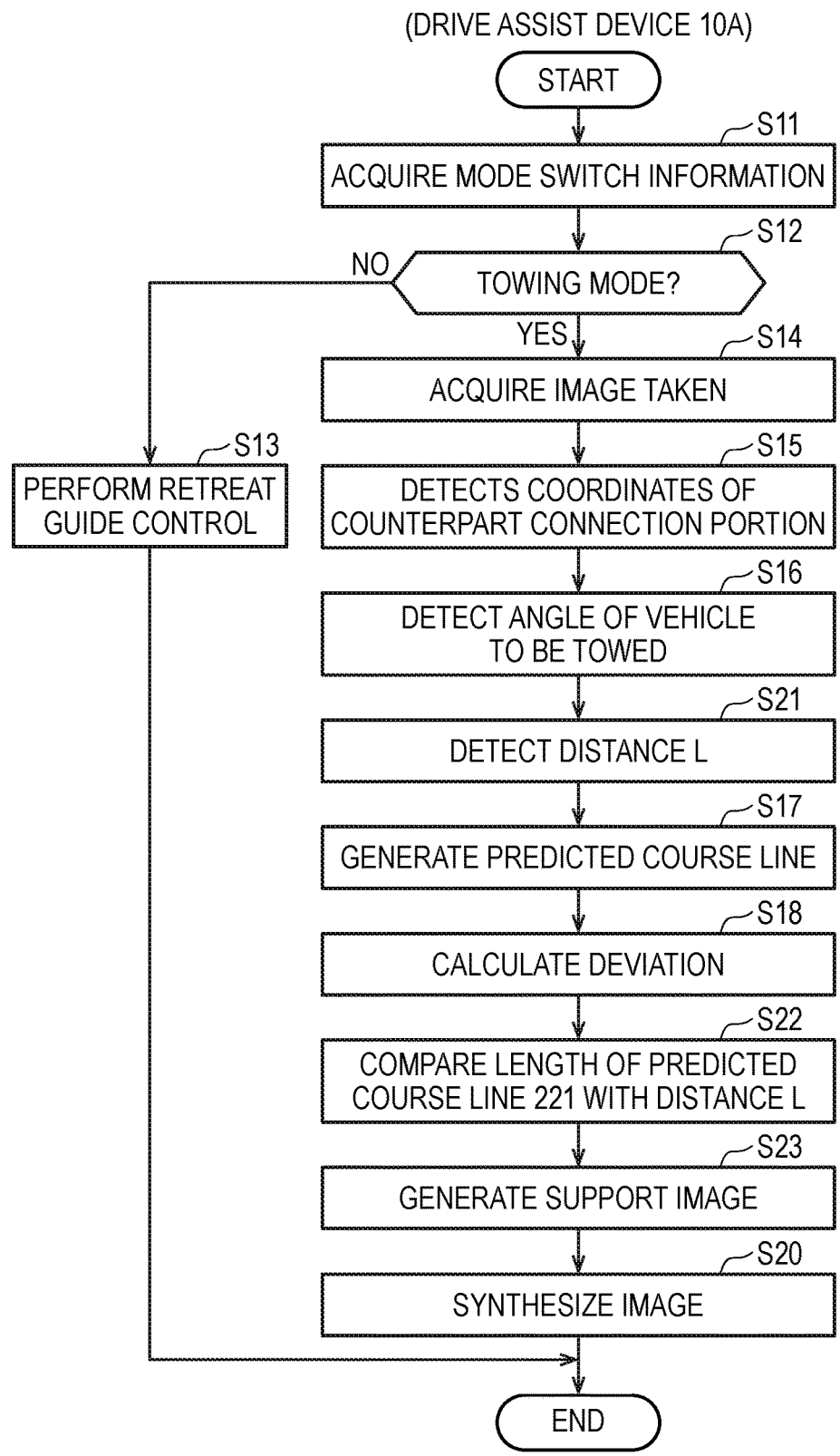
FIG. 13 is a flowchart showing an operation of the drive assist device according to the second embodiment of the invention.

FIG. 13 is a flowchart showing an operation of the drive assist device 10A according to the second embodiment of the invention. The flowchart of FIG. 13 is the same as the flowchart of FIG. 9 except that step S21 is added and steps S22 and S23 replace step S19 of the flowchart of FIG. 9. Descriptions of the steps of the flowchart of FIG. 13 that are same as in the flowchart of FIG. 9 will be omitted.

After the angle θ was detected at step S16, at step S21 the distance detection unit 313 calculates a distance L from the towing 3 to the counterpart connection portion C on the basis of the coordinates of the counterpart connection portion C detected at step S15.

At step S22, the support image generation unit 34B compares the length of the predicted course line 221 generated at step S17 with the distance L calculated at step S21.

At step S23, the support image generation unit 34B changes the display form of a distance line according to a result of the comparison made at step S22. More specifically, if the length of the predicted course line 221 is longer than or equal to the distance L, the support image generation unit 34B generates a first support image 23 including a first distance line 231 and a deviation numerical value portion 232 as shown in FIG. 6 and outputs the generated first support image 23 to the image synthesis unit 12.

On the other hand, if the length of the predicted course line 221 is shorter than the distance L, the support image generation unit 34B generates a second support image 23' including a second distance line 234 and a deviation numerical value portion 232 as shown in FIG. 12 and outputs the generated second support image 23' to the image synthesis unit 12.

At step S20, the image synthesis unit 12 generates a synthesized image 50 by superimposing the support image 23 or 23' on a rear frame 21 and outputs it to the display unit 20.

As described above in detail, in the drive assist device 10A according to the second embodiment, the position detection unit 31 measures a distance between the tractor vehicle V and the vehicle T to be towed. The support image generation unit 34B compares a length of the predicted course line 221 with the distance L and generates a support image with display forms that are different from each other when the length of the predicted course line 221 is longer than or equal to the distance L and when the length of the predicted course line 221 is shorter than the distance L.

With this measure, even if the length of the predicted course line 221 is shorter than the distance L, the user can recognize a deviation D between the predicted course line 221 and the counterpart connection portion C quantitively and intuitively.

In the drive assist device 10A according to the second embodiment, if the length of the predicted course line 221 is shorter than the distance L, the support image generation unit34B generates a distance line 234 so that the distance line 234 crosses the predicted course line 221.

With this measure, since the predicted course line 221 necessarily crosses the distance line 234 even if the length of the predicted course line 221 is shorter than the distance L, the user can recognize a deviation D between the predicted course line 221 and the counterpart connection portion C certainly.

In the drive assist device 10A according to the second embodiment, if the length of the predicted course line 221 is shorter than the distance L, the support image generation unit34B elongates the predicted course line 221 so that a distance line 231 crosses the predicted course line 221.

With this measure, since the elongated predicted course line 221 necessarily crosses the distance line 231 even if the length of the predicted course line 221 is shorter than the original distance L, the user can recognize a deviation between the elongated predicted course line 221 and the counterpart connection portion C certainly.

[5. Third Embodiment]

In the above-described first and second embodiments, the support image 23 or 23' consists of the distance line 231, 233, or 234 and the deviation numerical value portion 232.

In the third embodiment, a manipulation image indicating a user manipulation that is necessary to make the deviation D equal to 0 is generated as (part of) a support image in place of or in addition to the distance line 231, 233, or 234 and the deviation numerical value portion 232.

[5.1. Configuration of Drive Support Device 10B]

A functional block diagram showing the configuration of the drive support device 10B according to the third embodiment is basically the same as the functional block diagram shown in FIG. 2 or 11, and the drive support device 10B according to the third embodiment is different from the drive support device 10 or 10A according to the first or second embodiment only in the process executed by the support image generation unit 34 (see FIG. 2) or the support image generation unit 34B (see FIG. 11). The third embodiment will be described below with reference to the functional block diagram of FIG. 2.

The support image generation unit 34 generates, as part of a support image 23, a manipulation image indicating a user manipulation that is necessary to make the deviation D equal to 0 on the basis of a deviation D calculated by the deviation calculation unit 33. The support image 23 will be described below.

Figure 14:
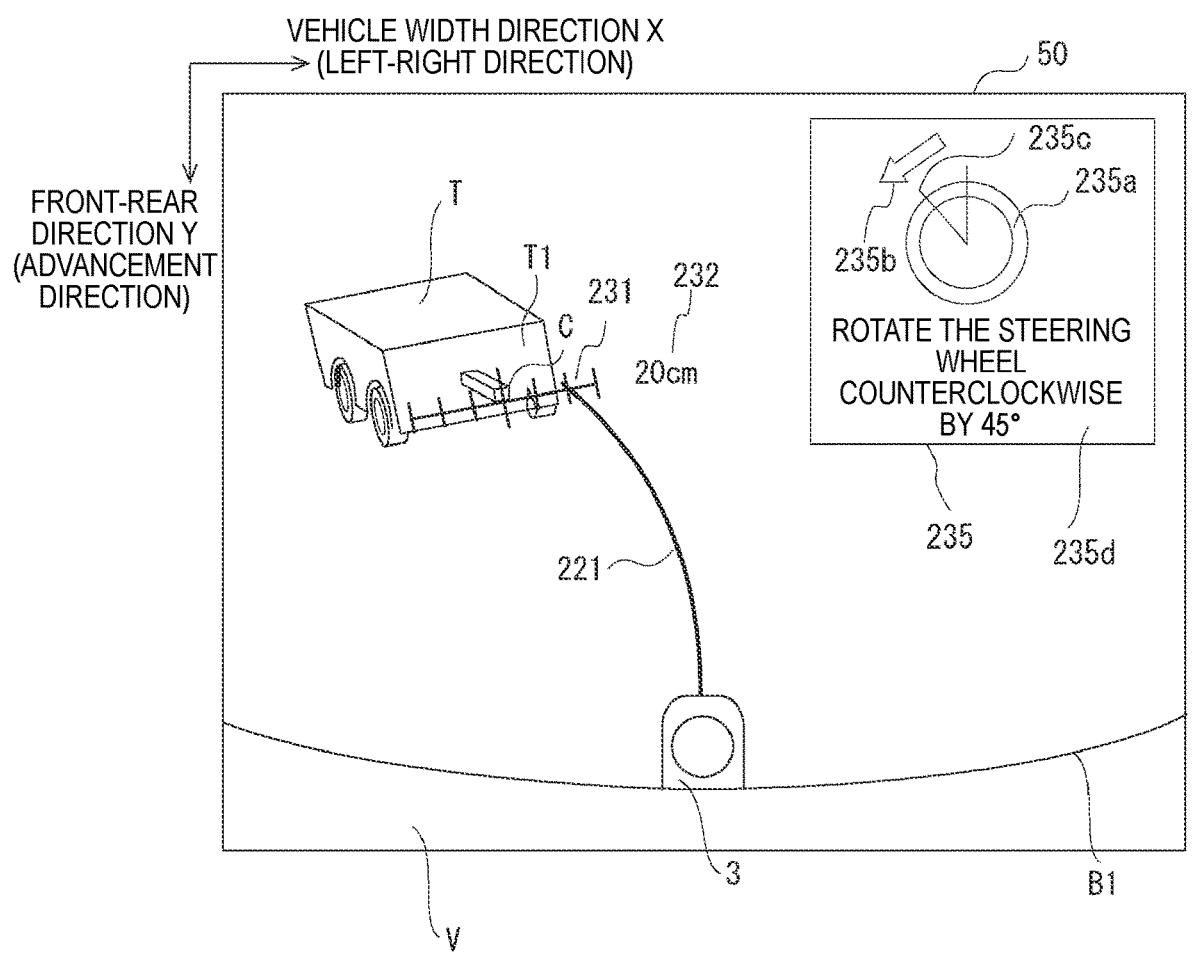
FIG. 14 is a diagram showing a synthesized image generated in the third embodiment of the invention.

FIG. 14 is a diagram showing a synthesized image 50 generated in the third embodiment of the invention. As shown in FIG. 14, the support image 23 includes a manipulation image 235 in addition to a distance line 231 and a deviation numerical value portion 232.

The manipulation image 235 is an image indicating a user manipulation that is necessary to make the deviation D equal to 0. More specifically, the manipulation image 235 is an image indicating steering wheel manipulation information that is necessary to make the deviation D equal to 0. More specifically, the manipulation image 235 is an image indicating a rotation direction and a rotation angle of the steering wheel that are necessary to make the deviation D equal to 0.

The support image generation unit 34 determines, through calculation, a manipulation amount of the steering wheel, that is, a rotation direction and a rotation angle of the steering wheel, as a correction manipulation amount for making the deviation D equal to 0. Rotation directions and angles of the steering wheel that are necessary to make respective deviations D equal to 0 may be measured in advance and stored in a nonvolatile memory (in advance) in the form of a map. In this case, the support image generation unit 34 reads out a rotation direction and angle from the map on the basis of a deviation D.

Assume that the deviation D is 20 cm and can be made equal to 0 by rotating the steering wheel counterclockwise by 45°. In this case, as shown in FIG. 14, the support image generation unit 34 generates, as a manipulation image 235, a simulated image 235a of the steering wheel, an arrow 235b indicating a rotation direction of the steering wheel, an additional line 235c indicating a counterclockwise rotation of 45°, and a message 235d as an instruction to rotate the steering wheel counterclockwise by 45°. The support image generation unit 34 outputs an image including the generated manipulation image 235 to the image synthesis unit 12. Thus, the user can intuitively understand a manipulation to be performed to make the deviation D equal to 0 and can make the deviation D equal to 0 merely by manipulating the steering wheel following the instruction of the manipulation image 235.

Figure 15:
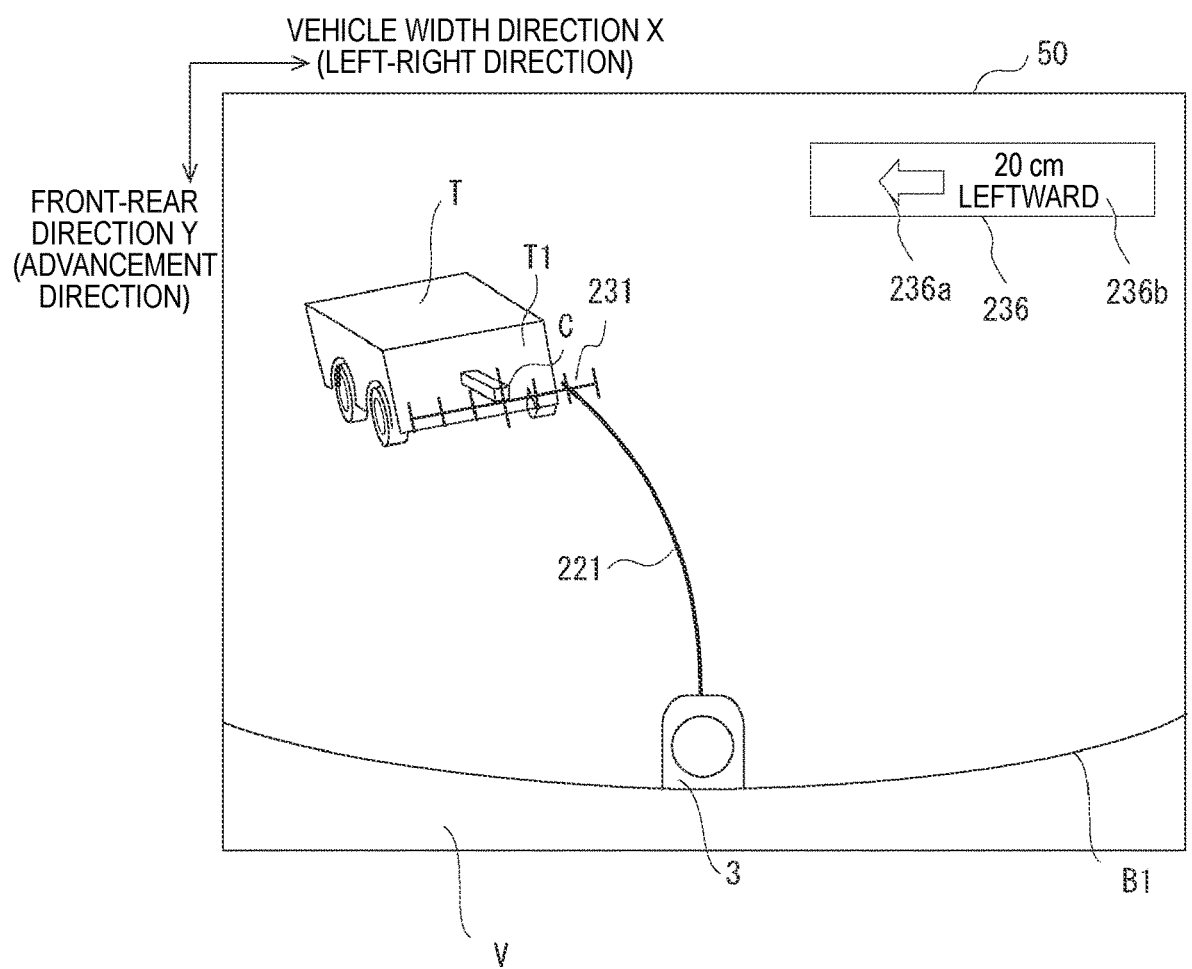
FIG. 15 is a diagram showing another example synthesized image generated in the third embodiment of the invention.

FIG. 15 is a diagram showing another example synthesized image 50 generated in the third embodiment of the invention. A manipulation image 236 shown in FIG. 15 is an image indicating a user manipulation that is necessary to make the deviation D equal to 0. More specifically, the manipulation image 236 shown in FIG. 15 is an image indicating, as a manipulation amount, a movement direction and distance of the predicted course line 221 that are necessary to make the deviation D equal to 0. Even more specifically, the manipulation image 236 is an image that includes an arrow 236a indicating a movement direction of the predicted course line 221 to make the deviation D equal to 0 and a message 236b indicating the movement direction and a movement distance.

Assume that as shown in FIG. 15 the predicted course line 221 is deviated rightward from the counterpart connection portion C by 20 cm. In this case, to indicate that it is necessary to move the predicted course line 221 leftward by 20 cm, the support image generation unit 34 generates a manipulation image 236 consisting of a leftward arrow 236a and a message "20 cm leftward" 236b. The support image generation unit 34 outputs an image including this manipulation image 236 to the image synthesis unit 12 as a support image 23. In this case, it is not necessary to generate a deviation numerical value portion 232 as shown in FIG. 6 because it will be a duplication of part of the message 236b. With this measure, the user can intuitively understand a manipulation to be performed to make the deviation D equal to 0 and can make the deviation D equal to 0 merely by manipulating the steering wheel so that the predicted course line 221 is moved following the instruction of the manipulation image 236.

[5.2. Details of Operation]

Figure 16:
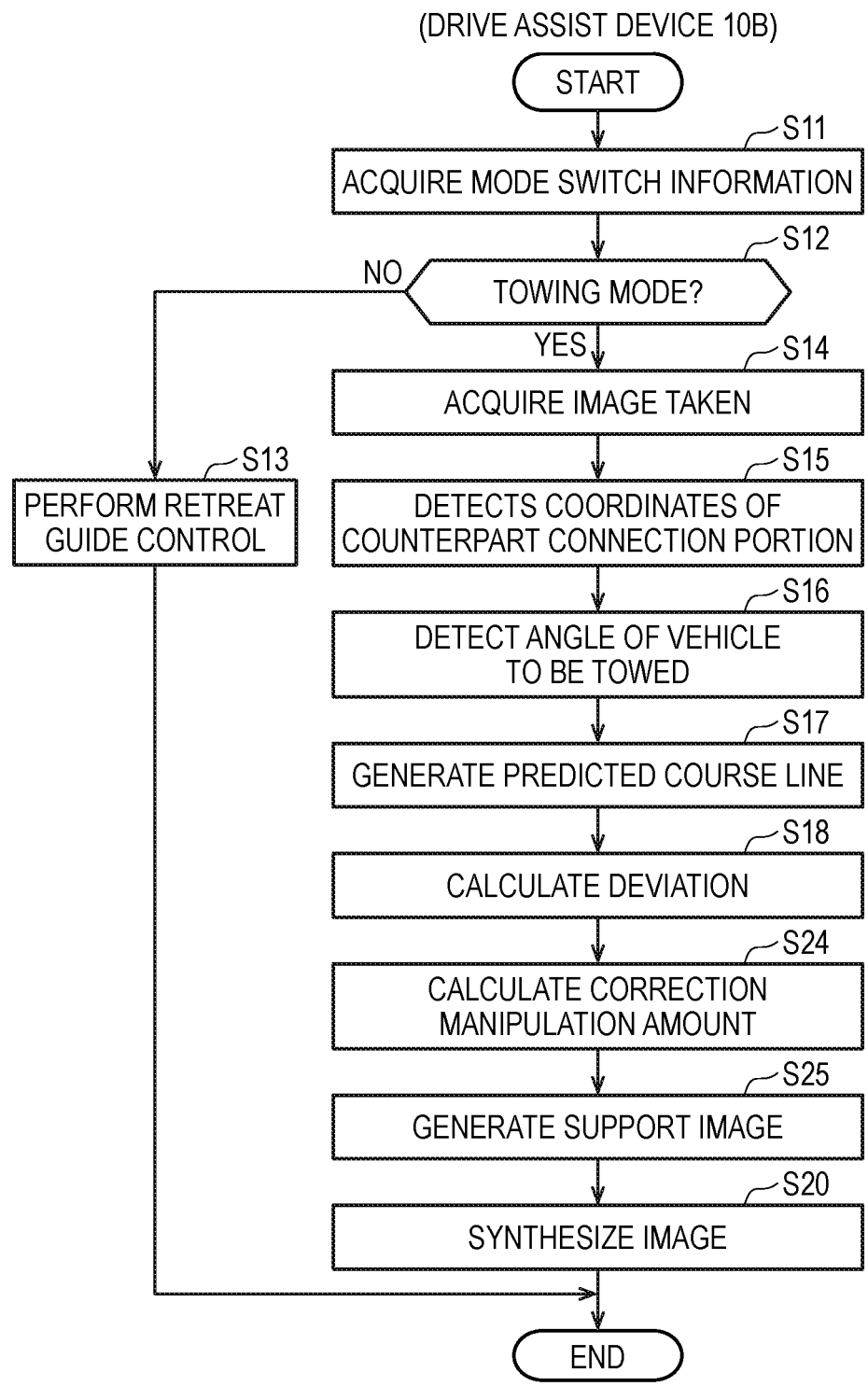
FIG. 16 is a flowchart showing an operation of the drive assist device according to the third embodiment of the invention.

FIG. 16 is a flowchart showing an operation of the drive assist device 10B according to the third embodiment of the invention. The flowchart of FIG. 16 is the same as the flowchart of FIG. 9 except that step S24 is added and step S25 replaces step S19 of the flowchart of FIG. 9. Descriptions of the steps of the flowchart of FIG. 16 that are same as in the flowchart of FIG. 9 will be omitted.

After the deviation calculation unit 33 calculated a deviation D at step S18, at step S24 the support image generation unit 34 calculates a correction manipulation amount that is necessary to make the deviation equal to 0.

At step S25, the support image generation unit 34 generates a support image 23 that includes a manipulation image 235 as shown in FIG. 14 or a manipulation image 236 as shown in FIG. 15 on the basis of the calculated correction manipulation amount and outputs the generated support image 23 to the image synthesis unit 12.

At step S20, the image synthesis unit 12 generates a synthesized image 50 by superimposing the support image 23 on a rear frame 21 and outputs the generated synthesized image 50 to the display device 20.

As described above in detail, in the drive assist device 10B according to the third embodiment, the support image generation unit 34 generates, as a support image 23, a manipulation image indicating a manipulation that is necessary to make the deviation equal to 0. With this measure, the user can make the deviation D equal to 0 by manipulating a vehicle member while referring to the information shown in the manipulation image. Thus, work of connecting the towing 3 can be made easier.

In the drive assist device according the third embodiment, the manipulation image is an image including information indicating a manipulation that needs to be performed on the steering wheel to make the deviation equal to 0. With this measure, the user can make the deviation D equal to 0 by manipulating the steering wheel while referring to the information shown in the manipulation image. Thus, work of connecting the towing 3 can be made easier.

In the drive assist device according the third embodiment, the manipulation image is an image including a rotation direction and a rotation angle of the steering wheel that are necessary to make the deviation D equal to 0. With this measure, the user can intuitively recognize a manipulation to be performed to make the deviation D equal to 0 and can make the deviation D equal to 0 by manipulating the steering wheel following the instruction of the manipulation image. Thus, work of connecting the towing 3 can be made even easier.

In the drive assist device according the third embodiment, the manipulation image is an image including a movement direction and a movement distance of the predicted course line that are necessary to make the deviation D equal to 0. With this measure, the user can intuitively recognize a manipulation to be performed to make the deviation D equal to 0 and can make the deviation D equal to 0 by manipulating the steering wheel so as to move the image synthesis unit 12 following the instruction of the manipulation image. Thus, work of connecting the towing 3 can be made easier.

[6. Fourth Embodiment]

In the above embodiments, a position of the counterpart connection portion C is detected by the position detection unit 31's performing image recognition on a rear frame 21. However, merely performing image recognition may be insufficient to detect a position of the counterpart connection portion C correctly. In view of this, in a fourth embodiment, a position of the counterpart connection portion C is detected by the user's touching the screen of the display device 20 at the position of the counterpart connection portion C while watching the vehicle T to be towed shown on the screen of the display device 20.

[6.1. Configuration of Drive Assist Device 10C]

Figure 17:
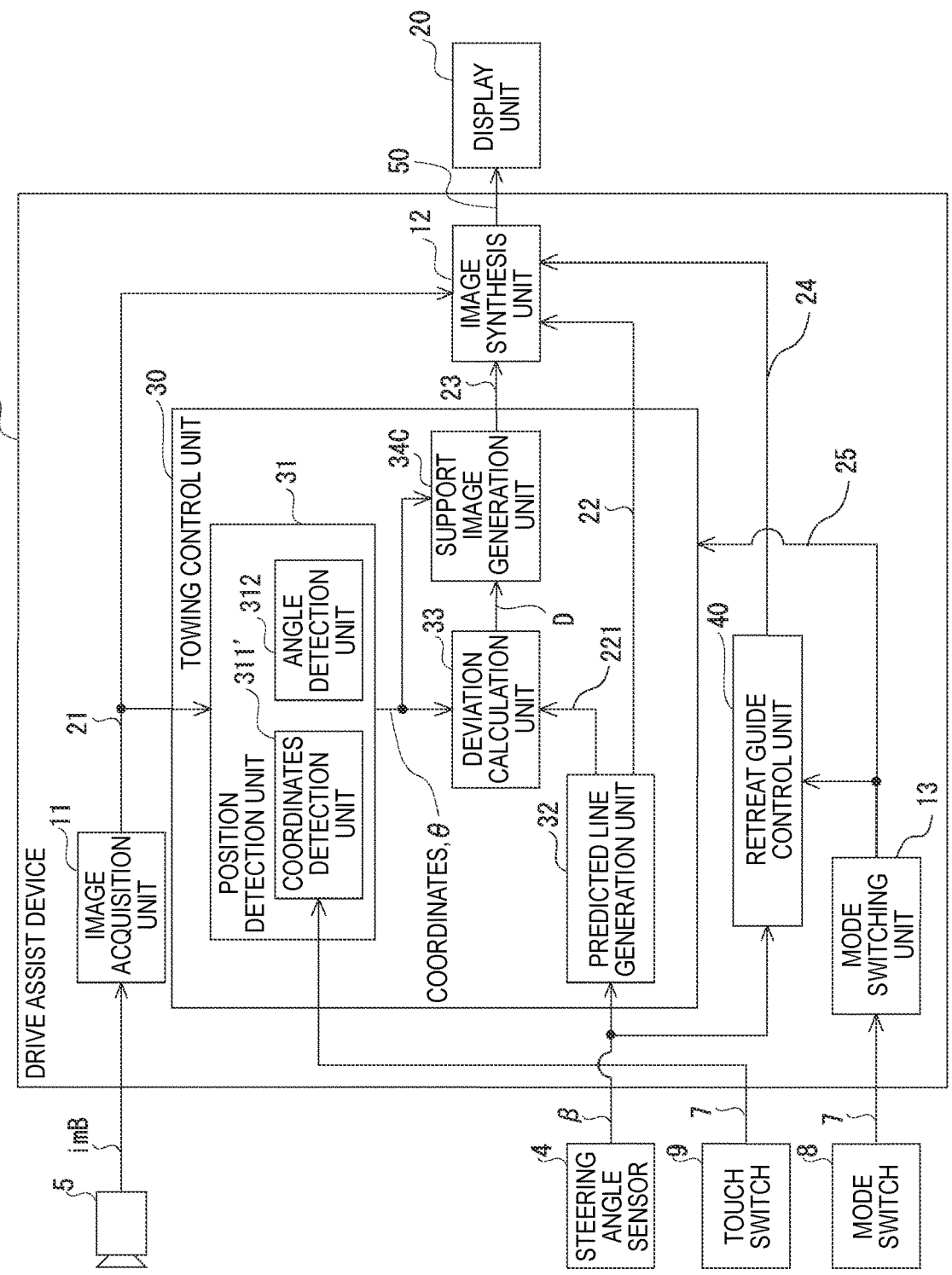
FIG. 17 is a functional block diagram showing the configuration of a drive assist device according to a fourth embodiment of the invention.

FIG. 17 is a functional block diagram showing the configuration of a drive assist device 10C according to the fourth embodiment of the invention. In FIG. 17, units, members, etc. having the same or equivalent ones in FIG. 2 are given the same reference symbols as the latter and will not be described redundantly. The configuration shown in FIG. 17 is different from the configuration shown in FIG. 2 in that a touch switch 9 is added as another member for providing input information and a coordinates detection unit 311' and a support image generation unit 34C replace the coordinates detection unit 311 and the support image generation unit 34 shown in FIG. 2, respectively.

The touch switch 9, which is implemented as transparent electrodes formed on the display screen, outputs coordinates information of a user touch position on the display screen to the coordinates detection unit 311'. This position coordinates information is coordinates in the camera coordinate system.

Like the coordinates detection unit 311 shown in FIG. 2, the coordinates detection unit 311' detects a position of the counterpart connection portion C as a first position by performing image recognition on a rear frame 21. The first position includes coordinates in the camera coordinate system and coordinates in the world coordinate system.

When acquiring position coordinates information on the display screen from the touch panel 9, the coordinates detection unit 311' regards this position as a position of the counterpart connection portion C and detects it as a second position on the basis of the position coordinates on the display screen. The second position includes coordinates in the camera coordinate system and coordinates in the world coordinate system.

When detecting one of a first position and a second position, the coordinates detection unit 311' employs the detected position as a position of the counterpart connection portion C. When detecting both of a first position and a second position, the coordinates detection unit 311' employs the second position preferentially. The coordinates detection unit 311' will be described below in more detail with reference to FIG. 18.

Figure 18:
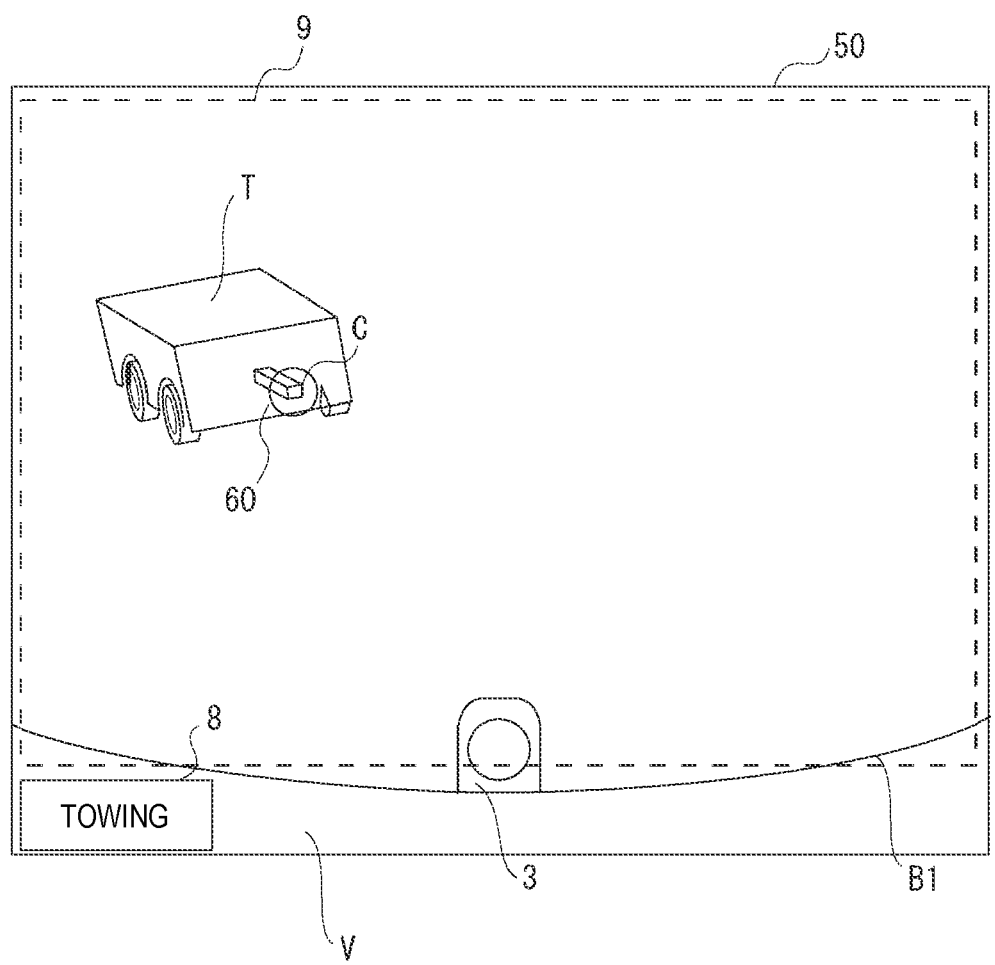
FIG. 18 shows a synthesized image generated in the fourth embodiment of the invention.

FIG. 18 shows a synthesized image 50 generated in the fourth embodiment of the invention. In FIG. 18, a rear frame 21 includes the vehicle T to be towed and the counterpart connection portion C.

When the mode of the drive assist device 10C is switched to the towing mode, the coordinates detection unit 311' detects a position of the counterpart connection portion C as a first position on the basis of a rear frame 21. At this time, to notify the user of the detection result, the coordinates detection unit 311' outputs coordinates information of the first position (hereinafter may be referred to as "temporary coordinates") to the support image generation unit 34C. The temporary coordinates that are output to the support image generation unit 34C are coordinates in the camera coordinate system. This is because as described later the support image generation unit 34C generates a support image 23 in which a marker 60 (see FIG. 18) is drawn at the position of the temporary coordinates in a rear frame 21 and hence coordinates in the camera coordinate system requires a smaller amount of processing than coordinates in the world coordinate system.

On the other hand, when the user touches the counterpart connection portion C in the synthesized image 50 (see FIG. 18) displayed on the display unit 20, the touch switch 9 outputs coordinates information on the display screen to the coordinates detection unit 311'.

Acquiring the coordinates information on the display screen from the touch switch 9 within a prescribed time T1, the coordinates detection unit 311' regards that the acquired coordinates position is of the counterpart connection portion C and detects the position of the counterpart connection portion C as a second position on the basis of the coordinates information on the display screen. Detecting the second position, the coordinates detection unit 311' finalizes the second position as a position of the counterpart connection portion C and outputs its coordinates (hereinafter may be referred to as "finalized coordinates") to the deviation calculation unit 33 and the support image generation unit 34C.

If the prescribed time T1 has elapsed without acquisition of coordinates information on the display screen from the touch switch 9, the coordinates detection unit 311' finalizes the first position as a position of the counterpart connection portion C and outputs the finalized coordinates to the deviation calculation unit 33 and the support image generation unit 34C.

The finalized coordinates of a first position or a second position that are output to the deviation calculation unit 33 are coordinates in the world coordinate system and the finalized coordinates of the first position or the second position that are output to the support image generation unit 34C are coordinates in the camera coordinate system.

Since a first position is detected by performing image recognition on a rear frame 21, there may occur an event that a first position cannot be detected because of low brightness around the vehicle V, the counterpart connection portion C's being interrupted by an obstacle, or some other reason. Thus, if the prescribed time T1 has elapsed without acquisition of coordinates information on the display screen from the touch switch 9, the coordinates detection unit 311' checks whether a first position has been detected.

More specifically, if a first position has been detected at a time point when the prescribed time T1 has elapsed, the coordinates detection unit 311' employs the first position as final coordinates. If a first position has not been detected at a time point when the prescribed time T1 has elapsed, which means that a position of the counterpart connection portion C has not been determined at this time point, the coordinates detection unit 311' instructs the support image generation unit 34C to urge the user to set a position of the counterpart connection portion C manually. That is, the coordinates detection unit 311' instructs the support image generation unit 34C to urge the user to touch the counterpart connection portion C shown on the display screen of the display unit 20. In the following, such an instruction may be referred to as a "manual setting instruction."

If succeeding in acquiring coordinates information on the display screen from the touch switch 9 within a second prescribed time T2 after outputting the manual setting instruction, the coordinates detection unit 311' judges that the acquired coordinates information represents a position of the counterpart connection portion C, touched by the user, shown on the display screen. The coordinates detection unit 311' detects a second position on the basis of the acquired coordinates information on the display screen and employs it as finalized coordinates. If the coordinates detection unit 311' cannot detect coordinates information even after a lapse of the prescribed time T2, which means that a position of the counterpart connection portion C cannot be determined, the towing mode is finished.

When acquiring temporary coordinates from the coordinates detection unit 311', the support image generation unit 34C generates, as a support image 23, an image in which a marker 60 is drawn at the position of the counterpart connection portion C (a pixel position in a rear frame 21) as shown in FIG. 18 and outputs the generated image to the image synthesis unit 12. As a result, the marker 60 is combined with a rear frame 21 in the image synthesis unit 12 and displayed on the display device 20 as shown in FIG. 18. Thus, the user can judge whether the counterpart connection portion C has been detected correctly by the drive assist device 10C.

Also when acquiring finalized coordinates from the coordinates detection unit 311', the support image generation unit 34C generates, as a support image 23, an image in which a marker 60 is drawn in the same manner. In this case, it is desirable that the support image generation unit 34C switch the display form when temporary coordinates are acquired and when finalized coordinates are acquired. For example, the support image generation unit 34C turns on and off the marker 60 when temporary coordinates are acquired and finishes the turning-on-and-off of the marker 60 when finalized coordinates are acquired. Alternatively, the support image generation unit 34C may switch the color or luminance of the marker 60 when temporary coordinates are acquired and when finalized coordinates are acquired. As a result, the user can easily recognize whether the detected position of the counterpart connection portion C is a finalized one.

When receiving a manual setting instruction from the coordinates detection unit 311', the support image generation unit 34C generates, as a support image 23, an instruction image 61 for urging the user to set a position of the counterpart connection portion C manually and outputs the generated support image 23 to the image synthesis unit 12. The instruction image 61 is combined with a rear frame 21 in the image synthesis unit 12 and displayed on the display device 20 as shown in FIG. 19.

Figure 19:
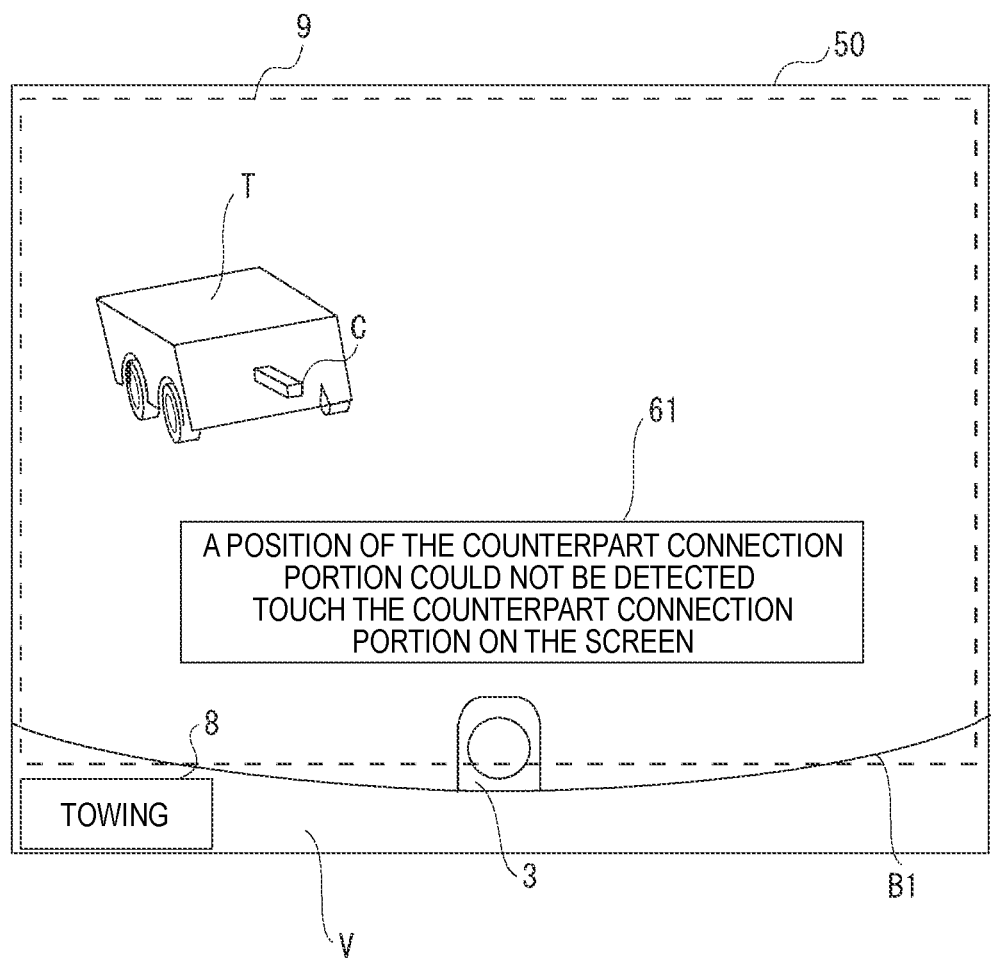
FIG. 19 shows another synthesized image generated in the fourth embodiment of the invention.

FIG. 19 is a diagram showing a synthesized image 50 generated in the fourth embodiment of the invention. As shown in FIG. 19, whereas the vehicle T to be towed and the counterpart connection portion C are included in a rear frame 21, no marker 60 is displayed because the coordinates detection unit 311 has not detected a position of the counterpart connection portion C yet. Instead, the instruction image 61 is displayed to urge the user to touch the counterpart connection portion C displayed.

Thus, the user can recognize that the drive assist device 10C could not detect a position of the counterpart connection portion C correctly. If the user touches the counterpart connection portion C on the display screen of the display unit 20 in response to the instruction of the instruction image 61, the coordinates detection unit 311' detects a correct position of the counterpart connection portion C.

[6.2. Details of Operation]

Figure 20:
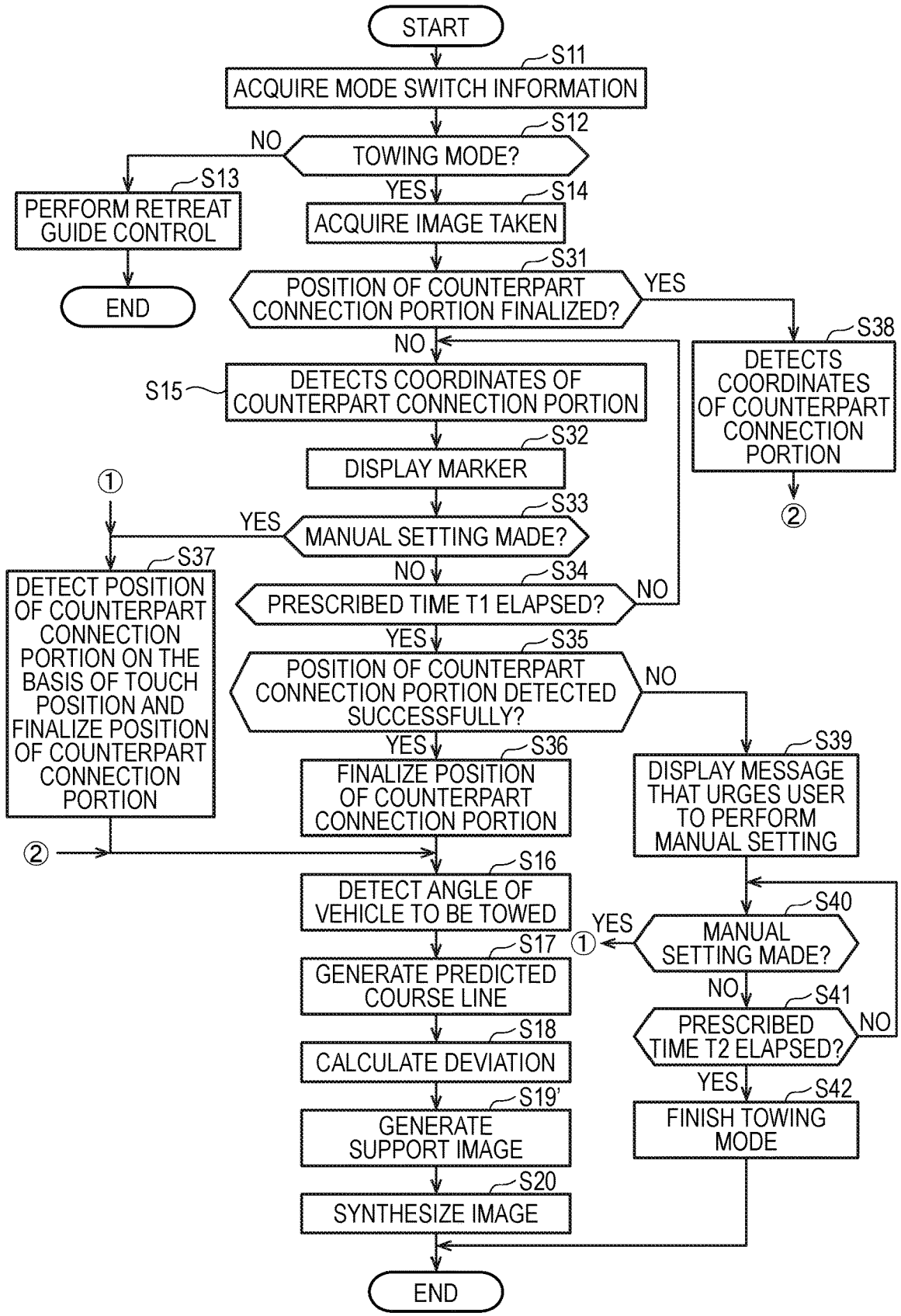
FIG. 20 is a flowchart showing an operation of the drive assist device according to the fourth embodiment of the invention.

FIG. 20 is a flowchart showing an operation of the drive assist device 10C according to the fourth embodiment of the invention. The flowchart of FIG. 20 is the same as the flowchart of FIG. 9 except that steps S31 to S42 are added and step S19' replaces step S19. Descriptions of the steps of the flowchart of FIG. 20 that are same as in the flowchart of FIG. 9 will be omitted.

When the mode of the drive assist device 10C is switched to the towing mode (S12: yes), at step S31 the coordinates detection unit 311' judges whether a position of the counterpart connection portion C has been finalized. Since a position of the counterpart connection portion C has not been finalized when switching is made to the towing mode, the process moves to step S15.

At step S15, the coordinates detection unit 311' detects coordinates of the counterpart connection portion C as a first position by performing image recognition on a rear frame 21. If succeeding in detecting coordinates of the counterpart connection portion C, the coordinates detection unit 311' outputs the detected coordinates to the support image generation unit 34C as temporary coordinates.

At the next step S32, the support image generation unit 34C and the image synthesis unit 12 generate a synthesized image 50 in which a marker 60 is drawn at the position of the temporary coordinates in a rear frame 21 and have it displayed on the display device 20.

More specifically, if receiving the temporary coordinates, at step S32 the support image generation unit 34C generates a support image 23 in such a display form that the marker 60 is drawn at the temporary coordinates and outputs the generated support image 23 to the image synthesis unit 12. The image synthesis unit 12 combines the support image 23 in which the marker 60 is drawn with a rear frame 21 and outputs a resulting synthesized image 50 to the display unit 20. As a result, if the tentative coordinates are ones detected correctly, the marker 60 is superimposed on the counterpart connection portion C in the manner shown in FIG. 18.

If not receiving tentative coordinates, naturally the support image generation unit 34C does not generate a support image 23 in which a marker 60 is drawn.

At step S33, the coordinates detection unit 311' judges whether manual setting has been made by the user on the basis of whether coordinates information has been input from the touch switch 9. If having received coordinates information from the touch switch 9, the coordinates detection unit 311' judges that manual setting has been made.

If manual setting has not been made by the user (S33: no), at step S34 the coordinates detection unit 311' judges whether a prescribed time T1 has elapsed from the switching to the towing mode. If the prescribed time T1 has elapsed yet (S34: no), the process returns to step S15. As a result, detection of a position of the counterpart connection portion C (step S15) and display of a marker 60 (step S32) are performed repeatedly until the prescribed time T1 elapses or the user makes manual setting before a lapse of the prescribed time T1.

While a position of the counterpart connection portion C remains temporary coordinates, steps S16 to S18 are not executed and hence a support image for reducing a deviation D (described in the preceding embodiments) is not included in the synthesized image 50. However, an alternative process is possible in which a deviation D is detected on the basis of the tentative coordinates and a support image for reducing the deviation D is generated together with the marker 60 even in the case where the position of the counterpart connection portion C is tentative coordinates. In this case, the contents of steps S16 to S18 may be added to the content of step S32.

If the prescribed time T1 has elapsed from the transition to the towing mode (S34: yes), at step S35 the coordinates detection unit 311' checks whether it has succeeded in detecting a position of the counterpart connection portion C. If succeeding in detecting a position of the counterpart connection portion C (S35: yes), at step S36 the coordinates detection unit 311' finalizes the detected coordinates as a first position and outputs the detected coordinates to the support image generation unit 34C as finalized coordinates.

If manual setting is made by the user before a lapse of the prescribed time T1 from the transition to the towing mode (S33: yes), the coordinates detection unit 311' regards, as a position of the counterpart connection portion C, coordinates information, on the display screen, of a user touch position received from the touch switch 9. At step S37, the coordinates detection unit 311' detects a position of the counterpart connection portion C as a second position on the basis of the received coordinates information and outputs the coordinates information to the support image generation unit 34C as finalized coordinates. Thus, the second position is made finalized coordinates with priority over the first position.

An affirmative judgment is made at step S33 and then step S37 is executed in the following situation. For example, a position of the counterpart connection portion C is detected as temporary coordinates through image recognition at step S15 and a marker 60 is displayed on the display screen at step S32. However, if the coordinates detection unit 311' detects a position of the counterpart connection portion C erroneously, a marker 60 is not displayed correctly at the position of the counterpart connection portion C shown in FIG. 18, that is, a marker 60 is displayed an a position different from the position of the counterpart connection portion C.

The user can recognize it if the position of the counterpart connection portion C has been detected erroneously by checking the displayed position of the marker 60. In this case, if the user touches the counterpart connection portion C on the display screen by himself or herself, a transition is made from step S33 to step S37, where the position of the counterpart connection portion C is detected correctly.

If the position of the counterpart connection portion C is finalized at step S36 or S37, at step S19' the support image generation unit 34C generates a support image 23 for reducing the deviation D (described above in the preceding embodiments) on the basis of an angle θ of the vehicle T to be towed detected at step S16, a predicted course line 221 generated at step S17, and a deviation D calculated at step S18.

At step S19', since the coordinates of the counterpart connection portion C are finalized coordinates, the support image generation unit 34C generates a marker 60 (see FIG. 18) in such a display form that it indicates that the coordinates are finalized ones, together with a support image for reducing the deviation D. The marker 60 may be generated only for a prescribed time after the finalization of the coordinates of the counterpart connection portion C.

After the finalization of the position of the counterpart connection portion C at step S36 or S37, when the process is executed next time onward, the coordinates detection unit 311' judges that the position of the counterpart connection portion C is finalized (S31: yes), continues to detect coordinates of the counterpart connection portion C at step S38, and executes step S16 and the following steps again.

At step S38, which is a step for detecting a position of the counterpart connection portion C after finalization of its position, the coordinates detection unit 311' detects a position of the counterpart connection portion C by performing image recognition on a rear frame 21 as at step S15. However, there may occur a case that the coordinates detection unit 311' cannot detect a position of the counterpart connection portion C after the finalization of its position.

In such a situation, that is, a position of the counterpart connection portion C cannot be detected at step S38, the coordinates detection unit 311' estimates a position of the counterpart connection portion C in the current rear frame 21 using a movement distance of the tractor vehicle V from a position, detected correctly in a preceding rear frame 21, of the counterpart connection portion C. The movement distance of the tractor vehicle V may be calculated on the basis of a vehicle speed detected by a vehicle speed sensor (not shown) and a steering angle β.

As described above, the drive assist device 10C continues to generate a support image 23 for reducing a deviation D and thereby assist the connection work even after the finalization of the position of the counterpart connection portion C.

On the other hand, if the prescribed time T1 has elapsed after the switching to the towing mode (S34: yes) and the coordinates detection unit 311' has not detected a position of the counterpart connection portion C yet (S35: no), the process moves to step S39.

At step S39, the coordinates detection unit 311', the support image generation unit 34C, and the image synthesis unit 12 generate a synthesized image 50 including a message that urges the user to touch the counterpart connection portion C on the display screen and has the synthesized image 50 displayed on the display device 20.

More specifically, at step S39, the coordinates detection unit 311' outputs a manual setting instruction to the support image generation unit 34C to urge the user to touch the counterpart connection portion C on the display screen. At step S39, receiving the manual setting instruction, the support image generation unit 34C generates, as a support image 23, an instruction image 61 as shown in FIG. 19 and outputs it to the image synthesis unit 12. At step S39, the image synthesis unit 12 combines the support image 23 including the instruction image 61 with a rear frame 21 and outputs a resulting synthesized image 50 to the display device 20. As a result, the instruction image 61 is displayed on the display screen in the manner shown in FIG. 19.

At step S40, the coordinates detection unit 311' judges whether manual setting has been made by the user on the basis of whether coordinates information has been received from the touch switch 9. The coordinates detection unit 311' judges that manual setting has been made if coordinates information is received from the touch switch 9.

If manual setting has not been made by the user yet (S40: no), at step S41 the coordinates detection unit 311' judges whether a second prescribed time T2 has elapsed from the display of the message for urging the user to perform manual setting at step S39. If the second prescribed time T2 has not elapsed yet (S41: no), the coordinates detection unit 311' returns to step S40 and waits until manual setting is made by the user.

If manual setting is made by the user before a lapse of the second prescribed time T2 (S40: yes), the coordinates detection unit 311' moves to step S37, where the coordinates detection unit 311' detects a position of the counterpart connection portion C as a second position on the basis of coordinates information on the display screen that has been input by a touch manipulation of the user and outputs the coordinates information to the support image generation unit 34C as finalized coordinates. Thus, a position of the counterpart connection portion C can be detected reliably even if the coordinates detection unit 311' fails to detect a position of the counterpart connection portion C through image recognition.

On the other hand, if the second prescribed time T2 has elapsed from the display of the message for urging the user to perform manual setting at step S39 (S41: yes), which means that the coordinates detection unit 311' has failed to detect a position of the counterpart connection portion C and the user has not perform manual setting, the coordinates detection unit 311' cannot determine a position of the counterpart connection portion C and hence the drive assist device 10C cannot assist the connection work. Thus, the mode switching unit 13 finishes the towing mode and switches to the retreat guide mode.

As described above in detail, in the drive assist device 10C according to the fourth embodiment, the position detection unit 31 detects a position of the counterpart connection portion C as a first position by recognizing the counterpart connection portion C on the basis of the image taken, detects a position of the counterpart connection portion C as a second position on the basis of the manipulation position if detecting a manipulation position of a user on the display unit 20, and gives priority to the second position over the first position if the second position is detected. With these measures, a position of the counterpart connection portion C can be detected reliably and correctly even in the case where a position of the counterpart connection portion C is not detected correctly through image recognition.

[7. Modifications]

Although in the above embodiments the steering angle sensor 4 detects a steering angle β of the left front wheel 1FL, the invention is not limited to this case. The steering angle sensor 4 may detect a rotation angle of the steering wheel of the vehicle V. In this case, a steering angle β of the wheels to steer the vehicle V is calculated on the basis of a rotation angle of the steering wheel.

In the above embodiments, functional blocks of each of the drive assist devices 10, 10A, 10B, and 10C may be implemented individually as one-chip semiconductor devices such as an LSIs or all or part of them may be implemented as a one-chip semiconductor device. The term "LSI" is used here, each semiconductor device may be referred to as an IC, a system LSI, a super LIS, or an ultra LSI depending on the degree of integration.

The manner for implementing an integrated circuit is not limited to formation of an LSI and may be formation of a dedicated circuit or a general-purpose processor. An FPGA (field programmable gate array) that can be programmed after manufacture as an LSI or a reconfigurable processor in which connections and settings of circuit cells inside an LSI can be reconfigured can also be used.

All or part of the process executed by each of the drive assist devices 10, 10A, 10B, and 10C may be implemented by programs. All or part of the processes executed by the respective functional blocks employed in each embodiment is executed by a central processing unit (CPU) in a computer. Programs according to which the respective processes are executed are stored in a storage device such as a hard disk drive or a ROM and run in a state that they are stored in the ROM or read out to a RAM.

Each process executed in each embodiment may be implemented by either hardware or software (including a case that an OS (operating system), middleware, or a prescribed library is involved) or even by mixture of software and hardware.

For example, where each function block of each of the drive assist devices 10, 10A, 10B, and 10C is implemented by software, each function block may be implemented as a software process using a hardware configuration (e.g., a hardware configuration in which a CPU, a ROM, a RAM, an input unit, output unit, etc. are connected to each other by a bus).

The order of execution of the steps of the process executed in each embodiment is not limited to the order described in the embodiment and may be changed without departing from the spirit and scope of the invention.

The invention encompasses computer programs for causing a computer to perform each of the above-described methods and a computer-readable recording medium stored with those programs. Examples of the computer-readable recording medium are a flexible disk, a hard disk drive, a CD-ROM, an MO, a DVD, a DVD-ROM, a DVD-RAM, a large capacity DVD, a next-generation DVD, and a semiconductor memory.

Although the embodiments of the invention have been described above, they are just examples of practice of the invention. Thus, the invention is not limited to the above embodiments and can be practiced being modified as appropriate without departing from the spirit and scope of the invention.

LIST OF REFERENCE SYMBOLS

V: Vehicle (tractor vehicle)
T: Vehicle to be towed
4: Steering angle sensor
5: Rear camera
10, 10A, 10B, 10C: Drive assist device
11: Image acquisition unit
12: Image synthesis unit
13: Mode switching unit
30: Towing control unit
31: Position detection unit
32: Predicted line generation unit
33: Deviation calculation unit
34, 34B, 34C: Support image generation unit.

What is claimed is:
1. A drive assist device which is installed in a tractor vehicle having a connection portion to be connected to a vehicle to be towed, the drive assist device comprising:
a hardware processor configured to:
acquire an image taken by a camera that photographs a scene adjacent to the tractor vehicle, the scene including the connection portion of the tractor vehicle;

detect a position of a counterpart connection portion of the vehicle to be towed, the counterpart connection portion being connectable to the connection portion of the tractor vehicle;

generate a predicted course line that the connection portion of the tractor vehicle is expected to follow based on a steering angle of the tractor vehicle;

calculate a deviation that is a distance between the counterpart connection portion and the predicted course line in a width direction of the vehicle to be towed based on the position of the counterpart connection portion and the predicted course line;

generate a support image to be used for reducing the deviation that has been calculated, the support image including a numerical value equal to the distance between the counterpart connection portion and the predicted course line in the width direction of the vehicle to be towed; and generate a synthesized image by combining the predicted course line and the support image with the image taken by the camera and output the generated synthesized image to a display device, wherein the support image includes a distance line that extends from the counterpart connection portion in the width direction of the vehicle to be towed parallel with a vehicle body front surface, from which the counterpart connection portion extends, of the vehicle to be towed.

2. The drive assist device according to claim 1, wherein the distance line has a start point corresponding to the counterpart connection portion, and extends from the start point in a direction in which the predicted course line is deviated from the counterpart connection portion.

3. The drive assist device according to claim 1, wherein the hardware processor is further configured to:

measure a distance between the tractor vehicle and the vehicle to be towed; and compare a length of the predicted course line with the distance and generate the support image with display forms that are different from each other when the length of the predicted course line is longer than or equal to the distance and when the length of the predicted course line is shorter than the distance.

4. The drive assist device according to claim 2, wherein the hardware processor is further configured to:

measure a distance between the tractor vehicle and the vehicle to be towed; and compare a length of the predicted course line with the distance and generate the support image with display forms that are different from each other when the length of the predicted course line is longer than or equal to the distance and when the length of the predicted course line is shorter than the distance.

5. The drive assist device according to claim 3, wherein when the length of the predicted course line is shorter than the distance, the hardware processor generates the distance line so that the distance line crosses the predicted course line.

6. The drive assist device according to claim 4, wherein when the length of the predicted course line is shorter than the distance, the hardware processor generates the distance line so that the distance line crosses the predicted course line.

7. The drive assist device according to claim 1, wherein the support image includes a manipulation image indicating a manipulation that is necessary to be performed to the tractor vehicle to make the deviation equal to 0.

8. The drive assist device according to claim 7, wherein the manipulation indicated by the manipulation image is to be performed on a steering wheel of the tractor vehicle to make the deviation equal to 0.

9. The drive assist device according to claim 8, wherein the manipulation image indicates a rotation direction and a rotation angle of the steering wheel of the tractor vehicle that are necessary to make the deviation equal to 0.

10. The drive assist device according to claim 7, wherein the manipulation image indicates a movement direction and a movement distance of the predicted course line that are necessary to make the deviation equal to 0.

11. The drive assist device according to claim 1, wherein the hardware processor detects a position of the counterpart connection portion as a first position by recognizing the counterpart connection portion based on the image taken by the camera, detects a position of the counterpart connection portion as a second position based on a manipulation position when detecting the manipulation position of a user on the display unit, and gives priority to the second position over the first position when the second position is detected.

12. A control method of a drive assist device which is installed in a tractor vehicle having a connection portion to be connected to a vehicle to be towed, the method being executed by a hardware processor of the tractor vehicle and comprising:

acquiring an image taken by a camera that photographs a scene adjacent to the tractor vehicle, the scene including the connection portion of the tractor vehicle;

detecting a position of a counterpart connection portion of the vehicle to be towed, the counterpart connection portion being connectable to the connection portion of the tractor vehicle;

generating a predicted course line that the connection portion of the tractor vehicle is expected to follow based on a steering angle of the tractor vehicle;

calculating a deviation that is a distance between the counterpart connection portion and the predicted course line in a width direction of the vehicle to be towed based on the position of the counterpart connection portion and the predicted course line;

generating a support image to be used for reducing the deviation that has been calculated, the support image including a numerical value equal to the distance between the counterpart connection portion and the predicted course line in the width direction of the vehicle to be towed; and generating a synthesized image by combining the predicted course line and the support image with the image taken by the camera and outputting the generated synthesized image to a display device, wherein the support image includes a distance line that extends from the counterpart connection portion in the width direction of the vehicle to be towed parallel with a vehicle body front surface, from which the counterpart connection portion extends, of the vehicle to be towed.

* * * * *